(12) United States Patent
Sigmund et al.

(10) Patent No.: US 8,509,745 B2
(45) Date of Patent: Aug. 13, 2013

(54) VOICEMAIL ARCHIVAL AND FORWARDING FUNCTIONALITY FOR COMMUNICATIONS NETWORKS AND DEVICES

(75) Inventors: William Joseph Sigmund, Cumming, GA (US); Michael Robert Zubas, Marietta, GA (US); Brian Keith Rainer, Lawrenceville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 12/161,035

(22) PCT Filed: Jun. 16, 2008

(86) PCT No.: PCT/US2008/067152
§ 371 (c)(1),
(2), (4) Date: Jul. 16, 2008

(87) PCT Pub. No.: WO2009/029323
PCT Pub. Date: Mar. 5, 2009

(65) Prior Publication Data
US 2010/0159889 A1    Jun. 24, 2010

Related U.S. Application Data

(60) Provisional application No. 60/969,419, filed on Aug. 31, 2007.

(51) Int. Cl.
*H04M 11/10* (2006.01)
*H04M 1/725* (2006.01)

(52) U.S. Cl.
USPC ........................... 455/413; 455/412.1

(58) Field of Classification Search
USPC .................... 455/413, 412.1, 412.2
See application file for complete search history.

(56) References Cited

U.S. PATENT DOCUMENTS

| 5,329,579 A | 7/1994 | Brunson |
| 5,524,137 A | 6/1996 | Rhee |

(Continued)

FOREIGN PATENT DOCUMENTS

| EP | 0 631 452 | 12/1994 |
| EP | 1 113 631 | 7/2001 |

(Continued)

OTHER PUBLICATIONS

U.S. Notice of Allowance dated May 26, 2011 in U.S. Appl. No. 12/201,945.

(Continued)

*Primary Examiner* — Kent Chang
*Assistant Examiner* — Scott Au
(74) *Attorney, Agent, or Firm* — Hartman & Citrin LLC

(57) ABSTRACT

A voicemail system (18, 24) includes a memory (36, 62) and a processor (32, 60). The memory (36, 62) can store data relating to one or more users. An incoming communication can be handled by the voicemail system (18, 24) and provided with functionality based upon a user's preferences, for example. The voicemail system (18, 24) can include functionality to allow a user to archive a voicemail message, to convert a voicemail message to a desired format, and/or to forward a voicemail message or converted voicemail message file to one or more designated destinations. The voicemail system (18, 24) can operate on a communications network (10), at a communications device (18), or both. Methods for archiving, converting, and/or forwarding voicemail messages are also disclosed.

16 Claims, 15 Drawing Sheets

(56) References Cited

U.S. PATENT DOCUMENTS

| | | | |
|---|---|---|---|
| 5,572,578 A | 11/1996 | Lin et al. | |
| 5,737,394 A * | 4/1998 | Anderson et al. | 379/88.11 |
| 5,737,395 A | 4/1998 | Irribarren | |
| 5,809,111 A | 9/1998 | Matthews | |
| 6,005,870 A | 12/1999 | Leung et al. | |
| 6,108,559 A | 8/2000 | Astrom et al. | |
| 6,148,212 A | 11/2000 | Park et al. | |
| 6,246,871 B1 | 6/2001 | Ala-Laurila | |
| 6,335,962 B1 | 1/2002 | Ali et al. | |
| 6,351,523 B1 | 2/2002 | Detlef | |
| 6,360,272 B1 | 3/2002 | Lincke et al. | |
| 6,480,885 B1 | 11/2002 | Olivier | |
| 6,522,727 B1 * | 2/2003 | Jones | 379/88.23 |
| 6,751,298 B2 | 6/2004 | Bhogal et al. | |
| 6,829,334 B1 | 12/2004 | Zirngibl | |
| 6,879,847 B1 | 4/2005 | Kato | |
| 6,912,275 B1 | 6/2005 | Kaplan | |
| 6,937,868 B2 | 8/2005 | Himmel et al. | |
| 6,981,023 B1 | 12/2005 | Hamilton et al. | |
| 7,095,828 B1 | 8/2006 | Elliot et al. | |
| 7,142,648 B1 | 11/2006 | Miller | |
| 7,171,186 B2 * | 1/2007 | Miyachi et al. | 455/343.5 |
| 7,248,857 B1 | 7/2007 | Richardson et al. | |
| 7,277,529 B1 | 10/2007 | Wuthnow et al. | |
| 7,283,809 B1 * | 10/2007 | Weinman, Jr. | 455/413 |
| 7,369,648 B1 | 5/2008 | Chang | |
| 7,680,491 B2 | 3/2010 | Zabawskyj et al. | |
| 7,738,833 B2 | 6/2010 | Bettis et al. | |
| 7,796,977 B2 | 9/2010 | Vander Veen | |
| 7,826,831 B2 | 11/2010 | Bettis et al. | |
| 7,894,580 B2 | 2/2011 | Veen et al. | |
| 8,320,535 B2 | 11/2012 | Alperin et al. | |
| 2002/0015403 A1 | 2/2002 | McConnell et al. | |
| 2002/0037075 A1 | 3/2002 | Flanagan | |
| 2002/0049768 A1 | 4/2002 | Peek et al. | |
| 2002/0077098 A1 | 6/2002 | Tiliks et al. | |
| 2002/0112007 A1 | 8/2002 | Wood et al. | |
| 2002/0115429 A1 * | 8/2002 | Deluca et al. | 455/413 |
| 2003/0091169 A1 | 5/2003 | Cain | |
| 2003/0099341 A1 | 5/2003 | Williams | |
| 2003/0220784 A1 | 11/2003 | Fellenstein et al. | |
| 2004/0023643 A1 | 2/2004 | Vander Veen et al. | |
| 2004/0081088 A1 | 4/2004 | Schinner et al. | |
| 2004/0139471 A1 | 7/2004 | Geen et al. | |
| 2004/0146147 A1 | 7/2004 | Picard et al. | |
| 2004/0248594 A1 | 12/2004 | Wren | |
| 2004/0252679 A1 | 12/2004 | Williams et al. | |
| 2004/0264658 A1 | 12/2004 | Cline et al. | |
| 2005/0089149 A1 | 4/2005 | Elias | |
| 2005/0102368 A1 * | 5/2005 | Forman et al. | 709/207 |
| 2005/0113078 A1 | 5/2005 | Deitrich | |
| 2005/0186944 A1 | 8/2005 | True et al. | |
| 2005/0213715 A1 | 9/2005 | Winick | |
| 2006/0003745 A1 | 1/2006 | Gogic | |
| 2006/0025114 A1 | 2/2006 | Bales et al. | |
| 2006/0025140 A1 | 2/2006 | Bales et al. | |
| 2006/0031470 A1 | 2/2006 | Chen et al. | |
| 2006/0059361 A1 | 3/2006 | Paden | |
| 2006/0062356 A1 | 3/2006 | Vendrow | |
| 2006/0171511 A1 | 8/2006 | Liu et al. | |
| 2006/0173959 A1 | 8/2006 | McKelvie et al. | |
| 2006/0239419 A1 | 10/2006 | Joseph et al. | |
| 2006/0251222 A1 | 11/2006 | Abramson et al. | |
| 2006/0253584 A1 | 11/2006 | Dixon et al. | |
| 2006/0281443 A1 | 12/2006 | Chen et al. | |
| 2007/0038483 A1 | 2/2007 | Wood | |
| 2007/0066284 A1 | 3/2007 | Gatzke et al. | |
| 2007/0127632 A1 | 6/2007 | Swingle et al. | |
| 2007/0127663 A1 | 6/2007 | Bae | |
| 2007/0140443 A1 | 6/2007 | Woodring | |
| 2007/0143106 A1 | 6/2007 | Dunsmuir | |
| 2007/0173233 A1 | 7/2007 | Vander Veen et al. | |
| 2007/0180032 A1 | 8/2007 | Pearson | |
| 2007/0180504 A1 | 8/2007 | Hung | |
| 2007/0207785 A1 | 9/2007 | Chatterjee et al. | |
| 2007/0213050 A1 | 9/2007 | Jiang | |
| 2007/0223666 A1 | 9/2007 | Teague | |
| 2007/0287453 A1 | 12/2007 | Wang | |
| 2008/0008163 A1 | 1/2008 | Castell et al. | |
| 2008/0008299 A1 | 1/2008 | Didcock et al. | |
| 2008/0056459 A1 | 3/2008 | Vallier et al. | |
| 2008/0062246 A1 | 3/2008 | Woodworth et al. | |
| 2008/0062938 A1 | 3/2008 | Gil-soo et al. | |
| 2008/0081609 A1 | 4/2008 | Burgan et al. | |
| 2008/0140767 A1 | 6/2008 | Rao et al. | |
| 2008/0167007 A1 * | 7/2008 | Novick et al. | 455/413 |
| 2008/0167010 A1 | 7/2008 | Novick et al. | |
| 2008/0167014 A1 * | 7/2008 | Novick et al. | 455/413 |
| 2008/0188204 A1 | 8/2008 | Gavner et al. | |
| 2008/0200152 A1 * | 8/2008 | Moore | 455/413 |
| 2008/0207176 A1 | 8/2008 | Brackbill et al. | |
| 2008/0243513 A1 | 10/2008 | Bucchieri et al. | |
| 2008/0260118 A1 | 10/2008 | Lyle | |
| 2008/0298459 A1 | 12/2008 | Yang et al. | |
| 2008/0300873 A1 | 12/2008 | Siminoff | |
| 2009/0149220 A1 | 6/2009 | Camilleri et al. | |
| 2009/0239507 A1 | 9/2009 | Sigmund et al. | |
| 2009/0253407 A1 | 10/2009 | Sigmund et al. | |
| 2009/0253412 A1 | 10/2009 | Sigmund et al. | |
| 2009/0253413 A1 | 10/2009 | Sigmund et al. | |
| 2010/0159886 A1 | 6/2010 | Sigmund et al. | |
| 2010/0159888 A1 | 6/2010 | Sigmund et al. | |
| 2010/0159890 A1 | 6/2010 | Sigmund et al. | |
| 2010/0159891 A1 | 6/2010 | Sigmund et al. | |
| 2010/0166161 A1 | 7/2010 | Dhawan et al. | |
| 2010/0167699 A1 | 7/2010 | Sigmund et al. | |
| 2010/0189229 A1 | 7/2010 | Sigmund et al. | |
| 2010/0195807 A1 | 8/2010 | Sigmund et al. | |
| 2010/0222024 A1 | 9/2010 | Sigmund et al. | |
| 2011/0085646 A1 | 4/2011 | Sigmund et al. | |
| 2013/0010937 A1 | 1/2013 | Sigmund et al. | |
| 2013/0012173 A1 | 1/2013 | Sigmund et al. | |

FOREIGN PATENT DOCUMENTS

| | | |
|---|---|---|
| EP | 1 434 415 | 6/2004 |
| EP | 1 599 022 | 11/2005 |
| KR | 2005 0001246 | 1/2005 |
| WO | WO 97/45991 | 12/1997 |
| WO | WO 98/03005 | 1/1998 |
| WO | WO 00/73947 | 12/2000 |
| WO | WO 02/065745 | 8/2002 |
| WO | WO 2004/046895 | 6/2004 |
| WO | WO 2007/081929 | 7/2007 |
| WO | WO 2007/095510 | 8/2007 |
| WO | WO 2007/096866 | 8/2007 |
| WO | WO 2008/034555 | 3/2008 |
| WO | WO 2009/029296 | 3/2009 |
| WO | WO 2009/029297 | 3/2009 |
| WO | WO 2009/029298 | 3/2009 |
| WO | WO 2009/029313 | 3/2009 |
| WO | WO 2009/029314 | 3/2009 |
| WO | WO 2009/029323 | 3/2009 |
| WO | WO 2009/029324 | 3/2009 |
| WO | WO 2009/029328 | 3/2009 |
| WO | WO 2009/029330 | 3/2009 |
| WO | WO 2010/002382 | 1/2010 |

OTHER PUBLICATIONS

U.S. Official Action dated Sep. 19, 2011 in U.S. Appl. No. 12/477,971.

U.S. Official Action dated Apr. 25, 2012 in U.S. Appl. No. 12/477,971.

U.S. Official Action dated Oct. 13, 2011 in U.S. Appl. No. 12/485,335.

U.S. Official Action dated Apr. 27, 2012 in U.S. Appl. No. 12/160,931.

U.S. Official Action dated Dec. 22, 2010 in U.S. Appl. No. 12/160,940.

U.S. Official Action dated May 31, 2011 in U.S. Appl. No. 12/160,940.

U.S. Official Action dated Apr. 26, 2012 in U.S. Appl. No. 12/160,946.

U.S. Official Action dated Nov. 4, 2011 in U.S. Appl. No. 12/160,956.
U.S. Official Action dated Jan. 12, 2011 in U.S. Appl. No. 12/161,021.
U.S. Official Action dated Jun. 1, 2011 in U.S. Appl. No. 12/161,021.
U.S. Official Action dated Dec. 15, 2011 in U.S. Appl. No. 12/161,021.
U.S. Official Action dated Nov. 29, 2010 in U.S. Appl. No. 12/161,027.
U.S. Official Action dated May 10, 2011 in U.S. Appl. No. 12/161,027.
U.S. Official Action dated Nov. 23, 2011 in U.S. Appl. No. 12/161,027.
U.S. Official Action dated Dec. 27, 2010 in U.S. Appl. No. 12/161,033.
U.S. Official Action dated May 31, 2011 in U.S. Appl. No. 12/161,033.
U.S. Official Action dated Nov. 29, 2011 in U.S. Appl. No. 12/161,033.
U.S. Official Action dated Jan. 24, 2011 in U.S. Appl. No. 12/161,064.
U.S. Official Action dated Jul. 8, 2011 in U.S. Appl. No. 12/161,064.
U.S. Official Action dated Jan. 30, 2012 in U.S. Appl. No. 12/161,064.
U.S. Official Action dated Jan. 19, 2011 in U.S. Appl. No. 12/161,076.
U.S. Official Action dated Jul. 1, 2011 in U.S. Appl. No. 12/161,076.
U.S. Official Action dated Jan. 17, 2012 in U.S. Appl. No. 12/161,076.
International Search Report & Written Opinion dated Sep. 18, 2008 in PCT Application PCT/US08/67612.
International Search Report & Written Opinion dated Aug. 1, 2008 in PCT Application PCT/US08/61493.
International Search Report & Written Opinion dated Nov. 12, 2008 in PCT Application PCT/US08/65046.
International Search Report & Written Opinion dated Mar. 13, 2009 in PCT Application PCT/US08/68738.
International Search Report & Written Opinion dated Oct. 29, 2008 in PCT Application PCT/US08/67176.
International Search Report & Written Opinion dated Sep. 4, 2008 in PCT Application PCT/US08/54074.
International Search Report & Written Opinion dated Sep. 3, 2008 in PCT Application PCT/US08/61592.
International Search Report & Written Opinion dated Sep. 4, 2008 in PCT Application PCT/US08/67152.
International Search Report & Written Opinion dated Nov. 6, 2008 in PCT Application PCT/US08/67591.
International Search Report & Written Opinion dated Aug. 28, 2008 in PCT Application PCT/US08/61437.
U.S. Notice of Allowance dated Nov. 21, 2012 in U.S. Appl. No. 12/477,971.
U.S. Notice of Allowance dated Nov. 23, 2012 in U.S. Appl. No. 12/485,335.
U.S. Notice of Allowance dated Oct. 25, 2012 in U.S. Appl. No. 12/160,940.
U.S. Notice of Allowance dated Nov. 16, 2012 in U.S. Appl. No. 12/161,027.
U.S. Notice of Allowance dated Dec. 27, 2012 in U.S. Appl. No. 13/616,198.
U.S. Office Action dated May 22, 2012 in U.S. Appl. No. 12/485,335.
U.S. Office Action dated Jun. 6, 2012 in U.S. Appl. No. 12/161,033.
U.S. Office Action dated Apr. 24, 2012 in U.S. Appl. No. 12/160,940.
U.S. Office Action dated Jun. 6, 2012 in U.S. Appl. No. 12/160,956.
U.S. Notice of Allowance dated Jun. 21, 2012 in U.S. Appl. No. 12/161,021.
U.S. Notice of Allowance dated Jul. 17, 2012 in U.S. Appl. No. 12/161,076.
U.S. Notice of Allowance dated Jul. 24, 2012 in U.S. Appl. No. 12/161,033.
U.S. Office Action dated Jul. 30, 2012 in U.S. Appl. No. 12/161,027.
U.S. Office Action dated Aug. 30, 2012 in U.S. Appl. No. 12/160,931.
U.S. Office Action dated Oct. 4, 2012 in U.S. Appl. No. 12/485,484.
U.S. Office Action dated Oct. 2, 2012 in U.S. Appl. No. 12/485,961.
U.S. Office Action dated Sep. 14, 2012 in U.S. Appl. No. 12/161,064.
U.S. Office Action dated Oct. 11 2012 in U.S. Appl. No. 12/160,946.
U.S. Notice of Allowance dated Feb. 28, 2013 in U.S. Appl. No. 12/161,064.
U.S. Office Action dated Feb. 28, 2013 in U.S. Appl. No. 13/654,480.
U.S. Notice of Allowance dated Jan. 31, 2013 in U.S. Appl. No. 12/485,961.

* cited by examiner

VOICEMAIL ARCHIVAL AND FORWARDING FUNCTIONALITY FOR COMMUNICATIONS NETWORKS AND DEVICES

RELATED APPLICATION

This application claims priority to U.S. Provisional Patent Application No. 60/969,419, filed Aug. 31, 2007, the entirety of which is hereby incorporated by reference.

TECHNICAL FIELD

The present disclosure relates generally to voicemail platforms for communications devices. More particularly, the present disclosure relates to systems and methods for providing dynamic voicemail archival and forwarding functionality for communications networks and devices.

BACKGROUND

Voicemail is a popular telephone service feature, and is often included in the price paid for telephone service. When a called line with voicemail functionality does not answer or is busy, a call can be handled by a voicemail system. A voicemail system can store recordings and/or announcements for a user. When a call is passed to a voicemail system, the voicemail system can play one or more recordings and/or announcements for the calling party or a generic message and can prompt the calling party to leave a message, for example, a spoken message. The voicemail system can record the calling party's message and store the message, for example, as audio data in a storage device. Call data associated with the message, for example, the calling party's telephone number, the date and time of the call, and the like, can also be stored by the voicemail system and associated with the stored message. Some voicemail systems also allow calling parties to leave alphanumeric messages for a called party. In any event, the voicemail system can store the message or data and associated call data.

Among the close to 100 million cellular telephone service users in the United States, a growing trend includes replacing terrestrial telephone services with cellular telephone services. In the event that a user determines to replace other telephone service with a cellular telephone line, a cellular telephone service may be the user's only telephone number. As such, voicemail service associated with a cellular telephone line can be relied upon by a user to report all missed telephone calls, whether those calls relate to personal or business matters.

The increased reliance upon cellular telephone service has been accompanied by a corresponding increased demand and increased reliance upon other cellular telephone features and functionality, for example, text messaging, email, Internet browsing, data transfer, and other features. As reliance upon and demand for cellular telephone services and voicemail increases, demand for enhanced voicemail services will likely continue to experience a corresponding increase.

SUMMARY

A system for providing voicemail archival functionality for a communications network can include a memory configured to store instructions and messages, a processor configured to execute the instructions stored in the memory, and a network interface. The instructions stored in the memory can include a voicemail application configured to obtain and store one or more messages from a calling party and a voicemail archival application configured to archive one or more stored messages. The voicemail forwarding application can further include instructions for converting one or more archived messages from a first file format to a second file format, for example, an audio file can be converted from adaptive multi-rate (AMR) to waveform audio (WAV), and the like. The instructions stored in the memory can include instructions for forwarding one or more archived messages to one or more recipients. The instructions stored in the memory can also include a billing application The instructions for archiving one or more stored messages can include instructions for sending a save command to the voicemail system at designated intervals and reiterating the sending of the save command indefinitely or for some designated period of time. For example, a user can determine that a message should be kept for one month. In such a case, the device or voicemail system can send a save command to the voicemail application at any interval necessary to ensure survival of the message for at least one month. In other embodiments, the instructions for archiving the one or more stored messages includes instructions for adding identifying information, for example, a tag or header data, to a stored message to designate the message as an archived message. In some embodiments, the instructions for archiving the one or more stored messages includes instructions for moving a stored message from a first memory location corresponding to a storage location to a second memory location corresponding to an archival location. The first and second memory locations can be part of the save storage device, or parts of separate devices.

A method for archiving one or more messages using a voicemail forwarding application of a voicemail system can include receiving, at the voicemail system, instructions to archive one or more messages and executing, at the voicemail system, instructions for archiving the one or more messages. The one or more archived messages can be stored at a memory location of the voicemail system corresponding to an archive location. The storage of an archived message can persist independent of message operations performed at other voicemail system locations, and until the archived message is moved from the archive location. For example, deletion of a message at a voicemail system can be ignored by other elements. As such, an archived message can be stored independent of changes made to other voicemail storage elements or messages therein. The instructions for archiving the one or more messages can include instructions for tagging the one or more messages as archived messages, for example, with a tag or header data. The archive location can be a memory location of the voicemail system or the mobile device. The instructions for archiving the one or more messages can include instructions for moving the one or more messages to the archive location of the voicemail system. In some embodiments, the archive location is separate from a storage location in which messages are stored prior to archival. In other embodiments, the stored and archived messages are stored in the same place. The instructions for archiving the one or more messages can include instructions for sending a save command to the voicemail system to save the one or more messages in the archive location of the voicemail system. The sending of the save command can be repeated at any designated interval to prevent deletion of the message from the voicemail system memory.

A mobile device including voicemail archival functionality can include memory configured to store instructions and messages, a processor for executing the instructions stored in the memory, and a network interface for transferring data to and from at least one cellular network. The instructions stored in the memory can include a voicemail application for storing one or more messages in the memory and a voicemail archival application for archiving one or more messages in the memory. The mobile device can also store messages at a network node, for example, a memory location at a voicemail system. The voicemail archival application can also include instructions for forwarding the one or more messages from a first file format to a second file format. The one or more messages can be stored at a memory location at the cellular network and a first memory location at the device and archived messages can be stored at a second memory location at the device. The one or more messages can be deleted from the memory location at the cellular network when the one or more messages are deleted from the first memory location at the device. The one or more archived messages can be stored independent of device and voicemail system actions. As such, the archived messages need not be deleted from the second memory location at the device until the archived messages are selected and deleted.

These and additional features of the present disclosure will become apparent with reference to the attached drawings, wherein:

DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
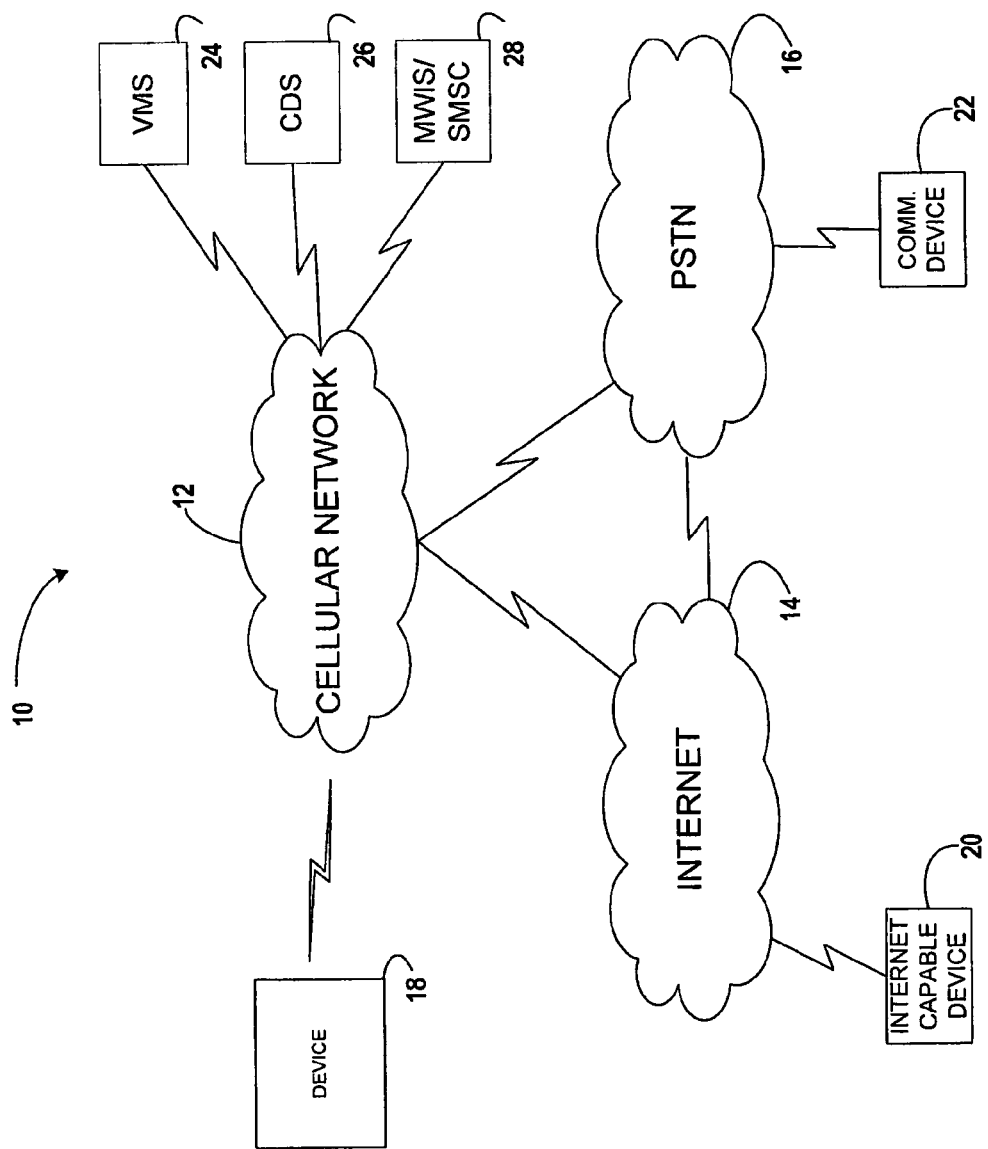
FIG. 1 schematically illustrates an exemplary communications network with which embodiments of the present disclosure can be implemented.

Referring now to the drawings in which like numerals represent like elements throughout the several views, FIG. 1 schematically illustrates an exemplary communications network 10. The illustrated exemplary network 10 includes a cellular network 12, the Internet 14, and a PSTN 16. The cellular network 12 can include various components such as, but not limited to, base transceiver stations (BTSs), base station controllers (BSCs), mobile switching centers (MSCs), short message service centers (SMSCs), multimedia messaging service centers (MMSCs), home location registers (HLRs), charging platforms, traditional or plain old voicemail platforms, visual voicemail platforms, GPRS core network components, and the like. A mobile device 18, such as, for example, a cellular telephone, a user equipment, a mobile terminal, a PDA, a handheld computer, a laptop computer, or a combination thereof, can be operatively linked and in communication with the cellular network 12. It should be understood that any device and/or network can be used with embodiments of the present disclosure.

The cellular network 12 can be configured as a 2G GSM (Global System for Mobile communications) network and provide data, communications via GPRS (General Packet Radio Service), and EDGE (Enhanced Data rates for GSM Evolution). Additionally, the cellular network 12 can be configured as a 3G UMTS (Universal Mobile Telecommunications System) network and can provide data communications via the HSPA (High-Speed Packet Access) protocol family, for example, HSDPA (High-Speed Downlink Packet Access), EUL (Enhanced Uplink) or otherwise termed HSUPA (High-Speed Uplink Packet Access), and HSPA+ (Evolved HSPA).

The cellular network 12 is also compatible with future mobile communications standards including, but not limited to, pre-4G and 4G, for example.

The illustrated cellular network 12 is shown in communication with the Internet 14 and a PSTN 16, though it will be appreciated that this is not necessarily the case. The cellular network 12 can include a wide array of nodes, devices, subsystems, networks, subnetworks, software, hardware, applications, and the like. For example, a cellular network 12 can include one or more messaging systems or nodes, for example, short message service centers (SMSCs), multimedia message service centers (MMSCs), voicemail systems, content delivery servers, and the like. A cellular network 12 can also include various radios and nodes for passing voice, data, and combinations thereof to and from radio transceivers, networks, and the Internet 14.

One or more Internet-capable devices 20, for example, a PC, a laptop, a portable device, an Internet-capable cellular telephone, a smart phone, or any other suitable device, can communicate with one or more cellular networks 12, or even a device 18 connected thereto, through the Internet 14. It will also be appreciated that the internet device 20 can communicate with the Internet 14, through the PSTN 16, the cellular network 12, or a combination thereof. As illustrated, a communications device 22, for example, a telephone, facsimile machine, modem, computer, or the like, can be in communication with the PSTN 16, and therethrough to the Internet 14 and/or the cellular network 12. It will be appreciated that the communications device 22 can be an Internet-capable device, and can be substantially similar to the Internet-capable device 20.

The illustrated communications network 10 includes a voicemail system 24 (VMS), a content delivery server 26 (CDS) for delivering messages and message content to mobile devices 18, and a message waiting icon server 28 (MWIS). The MWIS 28 can be or can include one or more short message service centers (SMSCs). The VMS 24 can be hardware, software, and/or a combination thereof, and includes traditional POVM voicemail systems as well as visual voicemail systems. While the VMS 24, the CDS 26, and the MWIS 28, are illustrated as being connected to the cellular network 12, it will be appreciated that the VMS 24, the CDS 26, and the MWIS 28, can each be hardware and/or software residing on one or more of the cellular network 12, the PSTN 16, the mobile device 18, the Internet 14, and that the VMS 24, the CDS 26, and the MWIS 28, can be accessible by and/or through multiple devices and networks, including private networks, which are not illustrated in FIG. 1. It should be appreciated that substantially all of the functionality described with reference to the communications network 10 can be performed by the cellular network 12.

Figure 2:
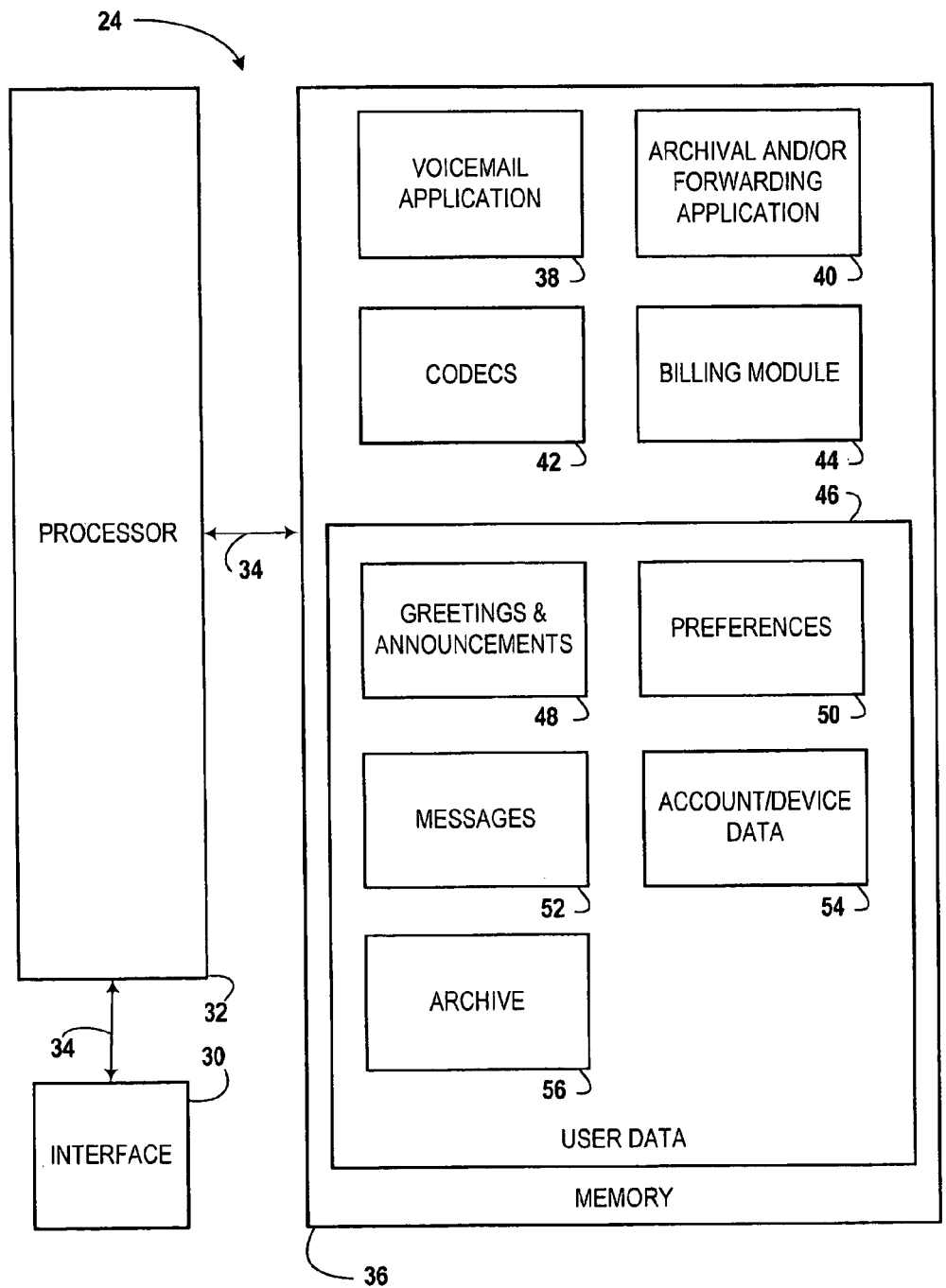
FIG. 2 schematically illustrates a voicemail system, according to an exemplary embodiment of the present disclosure.

FIG. 2, schematically illustrates a block diagram of a VMS 24, according to an exemplary embodiment of the present disclosure. The illustrated VMS 24 includes a communications network interface 30 that is operatively linked and in communication with a processor 32 via a data/memory bus 34. The communications network interface 30 can allow the VMS 24 to communicate with one or more components of the communications network 10, or any device connected to or residing on the communications network 10. It will be appreciated that if the VMS 24 resides on mobile device, for example, the device 18, that the communications network interface 30 can be a communications component of the device 18, for example, a short range radio device, a transceiver, receiver, transmitter, antennae, a connection port, or combinations thereof. The processor 32 is operatively linked and in communication with a memory 36 via a data/memory bus 34.

The word "memory," as used herein to describe the memory 36, collectively refers to all memory types associated with the VMS 24 such as, but not limited to, processor registers, processor cache, random access memory (RAM), other volatile memory forms, and non-volatile, semi-permanent or permanent memory types; for example, tape-based media, optical media, flash media, hard disks, combinations thereof, and the like. While the memory 36 is illustrated as residing proximate the processor 32, it should be understood that the memory 36 can be a remotely accessed storage system, for example, a server on the Internet 14, a remote hard disk drive, a removable storage medium, combinations thereof, and the like. Moreover, the memory 36 is intended to encompass network memory and/or other storage devices in wired or wireless communication with the VMS 24, which may utilize the communications network interface 30 to facilitate such communication. Thus, any of the data, applications, and/or software described below can be stored within the memory 36 and/or accessed via network connections to other data processing systems (not shown) that may include a local area network (LAN), a metropolitan area network (MAN), or a wide area network (WAN), for example. Accordingly, the present disclosure may operate on the VMS 24, wherein the VMS 24 is configured as a server to one or more client data processing systems as dictated by a client/server model.

The illustrated memory 36 can include one or more voicemail applications 38 (VMAs), one or more voicemail archival and/or forwarding applications 40 (VMAFs), one or more CODECs 42, and one or more billing modules 44. Additionally, the memory 36 can include other data, software, instructions, applications, and the like, for example, an operating system (not illustrated), hardware data, firmware, and the like. Although the VMA 38, the VMAF 40, the CODECs 42, and the billing modules 44 are shown as separate entities, it should be appreciated that substantially all of the functionality of the VMS 24 modules can be performed by a single application, program, utility, software package, or the like. The memory 36 can also include user data 46.

The VMA 38 can include instructions, programs, applications, software, and the like, for handling communications passed to the VMS 24. The VMA 38 can examine the communication passed to the VMS 24 to determine, for example, the called party, i.e., the user and the mailbox associated with the user. The VMS 24 can then retrieve the user's greetings or a default greeting for the user and record a message from the calling party for the called party. A message, as will be explained below in more detail, can include an audio recording, a text message, a video recording, an alphanumeric page, headers, and the like. The VMA 38 can also support message retrieval by a user or a user's device, as well as providing a telephone user interface (TUI) for calling parties and users. It will be appreciated that the VMA 38 can, but does not necessarily, operate in a manner substantially similar to traditional POVM voicemail systems and/or visual voicemail systems.

The VMAF 40 can include instructions, programs, applications, software and the like, for archiving messages. The VMAF 40 can archive messages at a network element or at a device 18, as will be explained in more detail below. The VMAF 40 can also include instructions, programs, applications, software, and the like, for forwarding messages, or portions thereof. The messages can be archived and/or forwarded in any desired format. As such, the VMAF 40 can include instructions, programs, applications, software, and the like, for converting messages, or portions thereof, to alternative formats, as will be explained in more detail below.

The VMAF 40 can convert audio or video files to alternative audio or video formats. Additionally, the VMAF 40 can convert an audio portion of a message to text. The VMAF 40 can, if desired, use an algorithm, for example, a CODEC, to encode or decode audio files and/or convert files to alternative formats. Messages can be archived as compressed files to reduce the use of network resources, if desired. Alternatively, the messages can be stored without any conversion and/or compression. The VMAF 40 can also format the delivery method of the messages, or portion(s) thereof. For example, the VMAF 40 can format an email message and attach a message, or a portion thereof, to the email message. Other archival functions, conversion formats, and delivery methods will be described below in more detail.

The CODECs 42 can include algorithms, programs, and/or software that is used by a hardware device or software to compresses or decompresses data, for example, video and audio data. It will be appreciated that the term "CODEC," as used herein and in the claims, refers to any algorithm, program, application, routine, subroutine, and the like, used to compress and/or decompress data. In the illustrated VMS 24, the CODECs 42 can be used by the VMAF 40 to convert voicemail message data. The CODECs 42 can include algorithms that direct computer programs or hardware devices, for example, how to represent a video or audio file in a manner that uses a minimum amount of data while retaining the original video or audio file quality. The use of the CODECs 42 can reduce the amount of storage space needed to store a video or audio file. Similarly, the CODECs 42 can be used to minimize the bandwidth required to transmit a video or audio file to, from, or through the communications network 10, or a device 18, 20, 22 connected thereto.

The billing module 44 can be used to track, collect, and/or report activities of the VMS 24 for billing purposes. For example, the billing module 44 can track how many messages are archived by the VMS 24 and how long each message has been archived. Additionally, the VMS 24 can track how much data is converted and or sent and received by the VMS 24 and report this information to a billing system of the communications network 10, for example. Billing can be pre-paid or post-paid. The VMS 24 archival, conversion, and/or forwarding functionalities can be charged on any desired basis, including, but not limited to, a per-use basis, a per-message basis, a duration basis, a file size basis, a per-byte basis, a per-kilobyte basis, combinations thereof, and the like. Additionally, or in the alternative, the archival, conversion, and forwarding functionalities can be billed as a flat fee, for example, as part of service package, or the like. In one embodiment, the archival, conversion, and forwarding functions, as well as other functionality, are included as features in an "Advanced Voicemail" package.

The user data 46 can include various types of data. For purposes of illustration, and not limitation, the user data 46 is illustrated in FIG. 2 and described herein as including a number of categories of data that can be associated with one or more users of the VMS 24. Exemplary categories of user data 46 can include, for example, greetings and announcements 48, user preferences 50, messages 52, account/device data 54, archived messages 56, and other data (not illustrated). The user data 46 can be configured, stored, synced, updated, and deleted by any number of users, network operators, or other authorized parties. It will be appreciated that greetings 48, preferences 50, messages 52, account/device data 54, archived messages 56, and other data, can be updated by a user of the VMS 24, or by any other authorized party. The messages 52 can be updated and stored by the VMS 24, for example, when a calling party leaves a message for the user or when a message is sent to the user.

The greetings and announcements 48 (greetings) can include greetings, announcements, forwarding greetings, schedules, and the like, and can be associated with a user. The greetings 48 can be configured by the user, by a network node, by the VMS 24, or by any other authorized party or device. For example, a user can record a greeting, schedule, a greeting introducing a forwarded message, an announcement, or the like, and store the greeting 48 on the VMS 24. As such, the greetings 48 can be audio data that is stored in the VMS memory 36 as, for example, an audio file. Additionally, the greetings 48 can be default messages that are created by the network or a network node and tailored for a user. The greetings 48 can be stored in any desired format. If the greetings 48 are stored as audio data, exemplary formats include, but are not limited to, waveform audio (WAV), audio interchange file format (AIFF), RAW, encoded in GSM CODEC, advanced audio coding (AAC), MPEG-1 audio layer 3 (MP3), MPEG-4 Part 14 (MP4 or M4A), Windows® media audio (WMA), RealAudio (RA), free lossless audio codec (FLAC), Apple® lossless encoder (ALE), i.e., Apple® lossless audio codec (ALAC), and other open and proprietary audio formats. It will be appreciated that the greetings 48, messages 52, and archived messages 56 can be converted as desired between one or more file formats.

The preferences 50 can include data relating to a user's preferences for the VMS 24. The preferences 50 can include, for example, an indication as to which functions the user wishes to make available to calling parties, archival locations, the class of service (CoS) for a user, conversion formats supported by the user's device, forwarding destination information, e.g., telephone numbers, email addresses, facsimile numbers, and the like, message time limits, voice to text settings, the number of rings allowed prior to passing a call to the VMS 24, message waiting indicator preferences, download settings, data routing preferences, and the like. It will be understood that users can customize many other functions and options of the VMS 24, including, for example, options for bypassing the VMS 24 and sending incoming calls for a user to another system, phone number, and/or user, forwarding numbers, voice or data delivery options, including formats, size, delivery times, email addresses, and the like, as well as other preferences.

The messages 52 can include, for example, audio files created by recordings made by the VMS 24, text created by a calling party or by the VMS 24, video messages, headers associated with audio, video, or text, and the like. For example, if a calling party leaves a spoken message for a called party, an audio file associated with a message 52 can be created by recording the spoken message. The audio files, if any, can be stored in any desired format, including, but not limited to, WAV, AIFF, RAW, encoded in GSM CODEC, AAC, MP3, MP4, M4A, WMA, RA, FLAC, ALE, ALAC, and other open and proprietary audio formats. Text data of the message 52 can include text created by the VMS 24, for example, using a speech to text converter. The text data can also include text created by or entered by the calling party, for example, an alphanumeric message, a callback number, a text message, and the like. The headers of the message 52 can include call data such as the MSISDN, the length of the message, the size of the text file, if applicable, the time and date of the call, priority information, and the like. In addition to the file formats discussed above, the video files, audio files, headers, and text can be stored in any network-recognizable format. The various data associated with a message 52 can be stored by the VMS 24 in any manner. If desired, the various data can be correlated to associate an audio file, a text file, and headers with each other as part of a message 52.

Time limits can be set to designate the "life" of one or more messages 52. In some embodiments, the messages 52 have a life of 14 days, after which the messages 52 can be automatically deleted from the VMS 24. In other embodiments, the life is set at 30 days. In still other embodiments, the data remains on the VMS 24 until a user deletes the message from the VMS 24. In some embodiments, the set time limit for the life of a message 52 does not begin to run until a user reviews the message 52. In still other embodiments, the time limit is set to any desired duration and is measured in any desired units, including, but not limited to, seconds, minutes, hours, days, weeks, months, and the like.

Account/device data 54 can include data relating to the user's account and/or device, including, but not limited to, the user's subscription plan and the user's device capabilities. For example, the VMS 24 can be in communication with one or more billing platforms, subscriber databases, other network nodes, and the like, to receive the account/device data 54 relating to a user's subscription plan, usage, and billing information. Additionally, the account/device data 54 can inform the VMS 24 of the features the user's device supports by indicating the IMEI, serial number, carrier, software version(s), firmware, carrier-specific applications, combinations thereof, or the like. The account/device data 54 can pass-through the VMS 24, or can be, stored, at least temporarily by the VMS 24. The VMS 24 can use the account/device data 54 to determine file formats and functionality that should be provided to a calling party or a user based upon billing, device, network, or other considerations. Additionally, billing considerations can be used to tailor options presented to a calling party or a user. For example, a user can instruct the VMS 24 to enable or disable various functions of the VMS 24 such as the ability to send text messages, the ability to archive messages, the ability to forward voicemail messages, and the like. Additionally, or in the alternative, a notification can be sent from a billing platform to the VMS 24 directly and the VMS 24 can disable functionality automatically. A user can be given the ability to override deactivation of any desired features or functionality.

Archived messages 56 can include data relating to messages that have been archived by the VMS 24, a user, or any other authorized party or system. As will be explained below in more detail, in some embodiments, messages are archived by moving messages, or copies thereof, to an archived messages 56 portion of the VMS memory 36. In other embodiments, messages are archived by "tagging" messages with data that indicates to the VMS 24 that the message is to be archived. A "tag" can include a header or other piece of data as part of the message, or corresponding to the message, that indicates the archived status of the message. This tag can be interpreted by the VMS 24 and employed to prevent, either permanently or temporarily, deletion of an archived message. In still other embodiments, messages are archived by downloading or forwarding an archived message to a device 18 or other designated recipient. These and other embodiments are discussed below in more detail.

Figure 3:
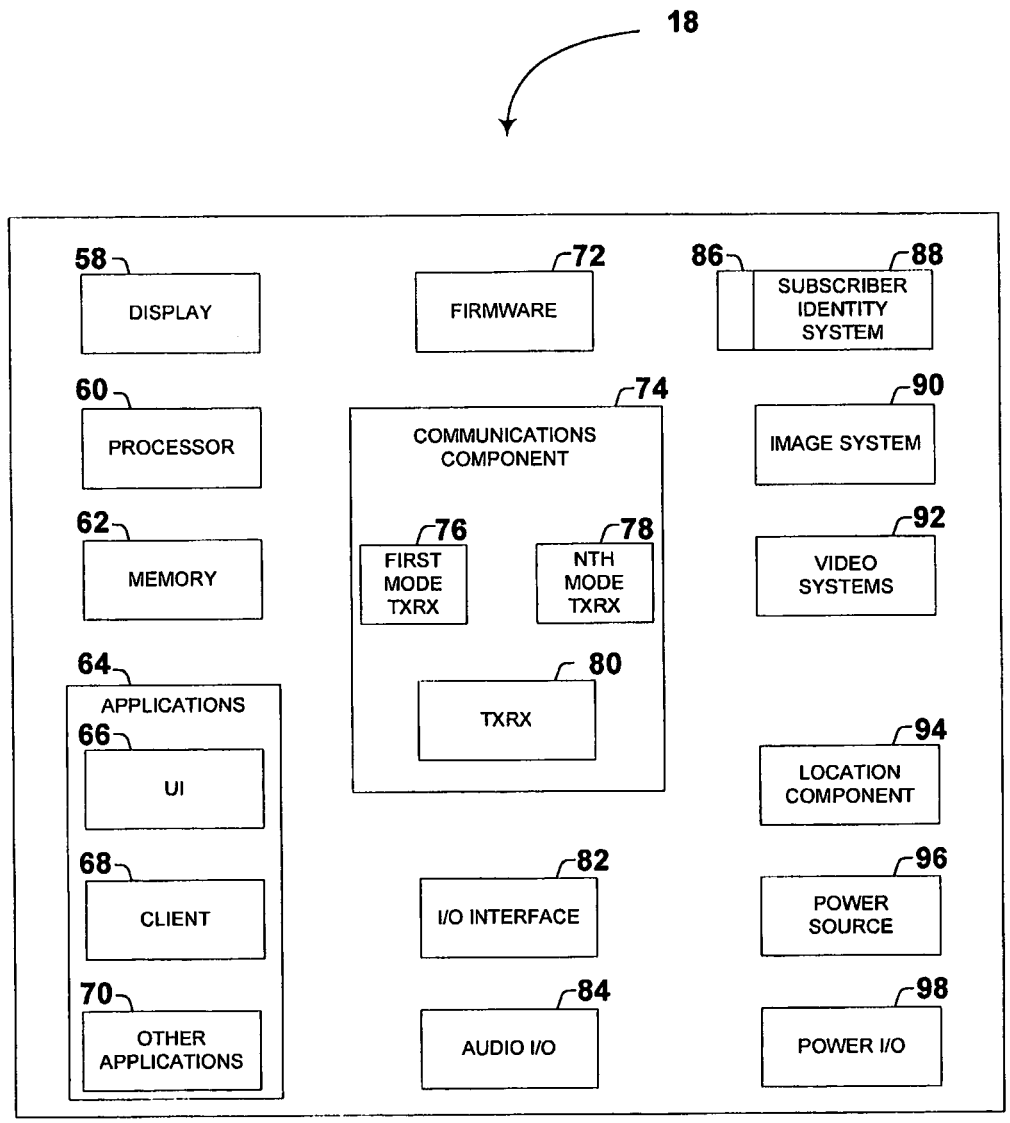
FIG. 3 schematically illustrates a block diagram of an exemplary mobile device for use with exemplary embodiments of the present disclosure.

FIG. 3 illustrates a schematic block diagram of an exemplary mobile communications device 18 for use in accordance with an exemplary embodiment of the present disclosure. Although no connections are shown between the components illustrated in FIG. 3, the components can interact with each other to carry out device functions.

As illustrated, the mobile communications device 18 can be a multimode handset. It should be understood that FIG. 3 and the following description are intended to provide a brief, general description of a suitable environment in which the various aspects of an embodiment of the present disclosure can be implemented. While the description includes a general context of computer-executable instructions, the present disclosure can also be implemented in combination with other program modules and/or as a combination of hardware and software. The term "application," or variants thereof, is used expansively herein to include routines, program modules, programs, components, data structures, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The device 18 can include a variety of computer readable media, including volatile media, non-volatile media, removable media, and non-removable media. Computer-readable media can include device storage media and communication media. Storage media can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed by the device 18.

The device 18 can include a display 58 for displaying multimedia such as, for example, text, images, video, telephony functions such as Caller ID data, setup functions, menus, music, metadata, messages, wallpaper, graphics, internet content, device status, preferences settings, map data, location data, and the like. The device 18 can include a processor 60 for controlling, and/or processing data. A memory 62 can interface with the processor 60 for the storage of data and/or applications 64. An application 64 can include, for example, video player software, voicemail software, conversion software, archival software, forwarding software, audio playback software, music player software, email software, messaging software, combinations thereof, and the like. The application 64 can also include a user interface (UI) application 66. The UI application 66 can interface with a client 68 (e.g., an operating system) to facilitate user interaction with device functionality and data, for example, answering/initiating calls, entering/deleting data, configuring settings, address book manipulation, multimode interaction, and the like. The applications 64 can include other applications 70 such as, for example, firmware, visual voicemail software, add-ons, plug-ins, voice recognition, call voice processing, voice recording, messaging, e-mail processing, video processing, image processing, voicemail file archival, converting, and forwarding, music play, combinations thereof, and the like, as well as subsystems and/or components. The applications 64 can be stored in the memory 62 and/or in a firmware 72, and can be executed by the processor 60. The firmware 72 can also store code for execution during initialization of the device 18.

A communications component 74 can interface with the processor 60 to facilitate wired/wireless communications with external systems including, for example, cellular networks, VoIP networks, LAN, WAN, MAN, PAN, that can be implemented using Wi-Fi, Wi-Max, combinations and/or improvements thereof, and the like. The communications component 74 can also include a multimode communications subsystem for providing cellular communications via different cellular technologies. For example, a first cellular transceiver 76 can operate in one mode, for example, GSM, and an Nth transceiver 78 can operate in a different mode, for example UMTS. While only two transceivers 76, 78 are illustrated, it should be appreciated that a plurality of transceivers can be included. The communications component 74 can also include a transceiver 80 for unlicensed communications using technology such as, for example, WI-FI, WI-MAX, BLUETOOTH, infrared, IRDA, NFC, RF, and the like. The communications component 74 can also facilitate communications reception from terrestrial radio networks, digital satellite radio networks, Internet-based radio services networks, combinations thereof, and the like. The communications component 74 can process data from a network such as, for example, the Internet, a corporate intranet, a home broadband network, and the like, via an ISP, DSL provider, or broadband provider.

An input/output (I/O) interface 82 can be provided for input/output of data and/or signals. The I/O interface 82 can be a hardwire connection, such as, for example, a USB, mini-USB, audio jack, PS2, IEEE 1394, serial, parallel, Ethernet (RJ48), RJ11, and the like, and can accept other I/O devices such as, for example, a keyboard, keypad, mouse, interface tether, stylus pen, printer, thumb drive, touch screen, touch pad, trackball, joy stick, microphones, remote control devices, monitor, display, LCD, combinations thereof, and the like. It will be appreciated that the I/O interface 82 can be used for communications between the device and a network or local device, instead of, or in addition to, the communications component 78.

Audio capabilities can be provided by an audio I/O component 84 that can include a speaker for the output of audio signals and a microphone to collect audio signals. The device 18 can include a slot interface 86 for accommodating a subscriber identity system 88 such as, for example, a SIM or universal SIM (USIM). The subscriber identity system 88 instead can be manufactured into the device 18, thereby obviating the need for a slot interface 86. The device 18 can include an image capture and processing system 90. Photos and/or videos can be obtained via an associated image capture subsystem of the image system 90, for example, a camera. The device 18 can also include a video component 92 for processing, recording, and/or transmitting video content.

A location component 94, can be included to send and/or receive signals such as, for example, GPS data, triangulation data, combinations thereof, and the like. The device 18 can use the received data to identify its location or can transmit data used by other devices to determine the device 18 location. The device 18 can include a power source 96 such as batteries and/or other power subsystem (AC or DC). The power source 96 can interface with an external power system or charging equipment via a power I/O component 98.

Figure 4:
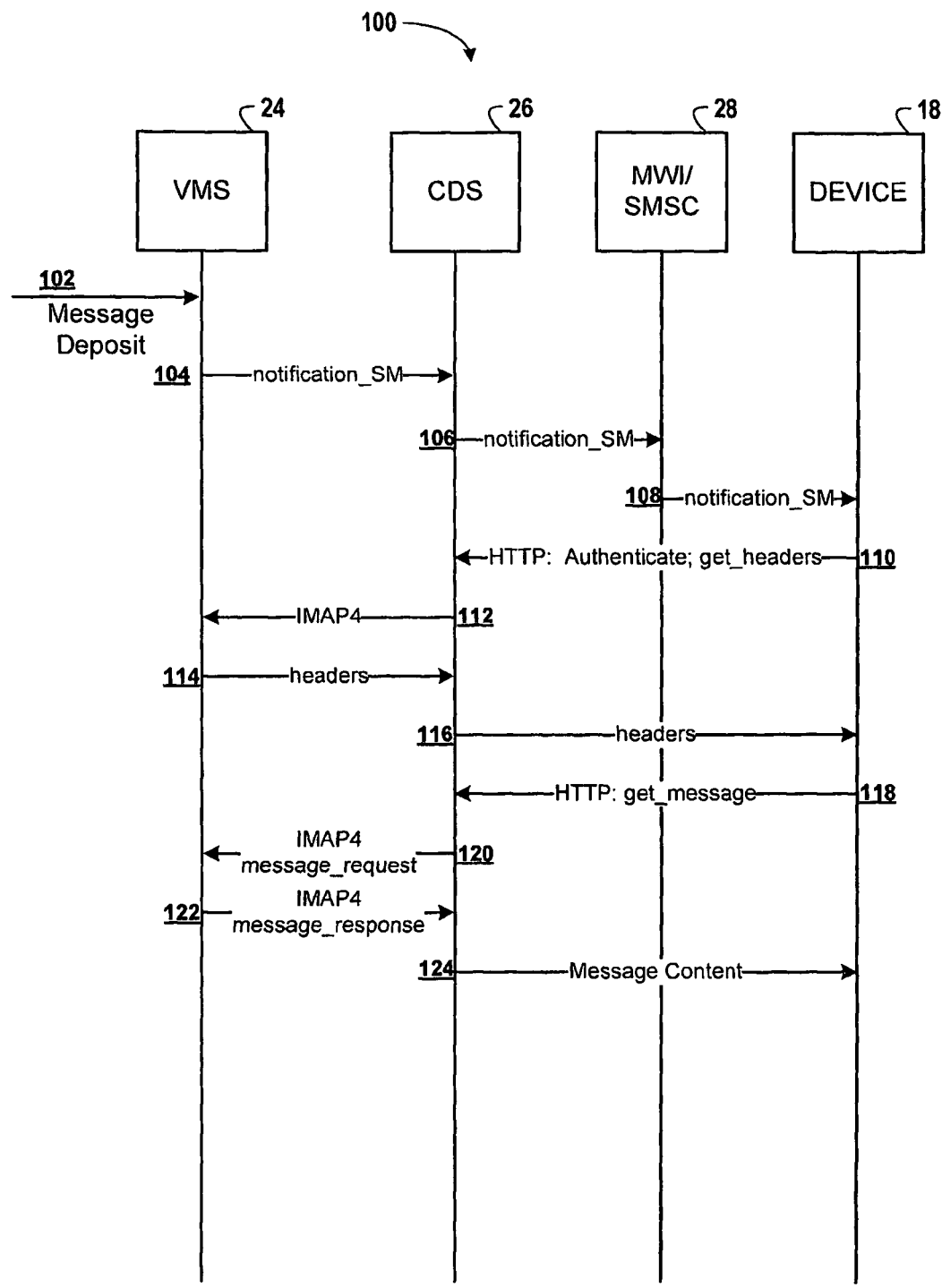
FIG. 4 is a call flow diagram illustrating an exemplary method for downloading a voicemail deposited at a voicemail system to a device, according to an exemplary embodiment of the present disclosure.

FIG. 4 schematically illustrates an exemplary method 100 for voicemail message deposit and subsequent retrieval of message content for local storage on a mobile device. It should be understood that the steps described are not necessarily presented in any particular order and that performance of some or all of the steps in an alternative order(s) is possible and is contemplated. The steps have been presented in the demonstrated order for ease of description and illustration. Steps can be added, omitted and/or performed simultaneously without departing from the scope of the appended claims. Some or all steps of this process, and/or substantially equivalent steps, can be performed by execution of computer-readable instructions included on a computer readable medium.

In an attempt to simplify the description of the method 100, various network elements and nodes have been omitted from the illustrated call flow diagram. Similarly, messages and data are described in generic terms, though it will be appreciated that multiple message and data formats, as well as multiple message and data nodes, relays, and messaging platforms can be involved in any or all of the communications described herein.

In an additional attempt to simplify the description and to avoid complicating the disclosure, the following description will describe, in general terms, performance of various methods embodying some concepts of various embodiments of the disclosure. In reading the description of the several methods herein, it should be understood that a user can interact with a VMS 24 using a telephone user interface (TUI), a GUI, or another UI. Alternatively, a user can interact with the device 18, and the device 18 can handle all communication needed to instruct the VMS 24 how to carry out the user's desired actions. Therefore, DMTF-driven TUIs, icon-based GUIs, touch-sensitive screen GUIs, voice-driven TUIs, and the like are included in the following descriptions of the exemplary methods disclosed herein and are included in the scope of the appended claims.

The illustrated message method 100 begins with a message being deposited at the VMS 24, as illustrated at step 102. In the illustrated embodiment, the VMS 24 notifies the CDS 26, for example, by generating a SMPP notification message (notification_SM) that is sent to the CDS 26, as shown at step 104. A notification_SM message can include, but is not limited to, the hostname and port number for the subscriber's CDS 26, a token identifying the subscriber's VMS 24, the subscriber's voicemail box ID embedded with a token to uniquely identify the subscriber for the VMS 24, and the current VMS password. In some alternative embodiments, the notification_SM includes an IP address and port number for the subscriber's CDS 26 and a mailbox_ID. The password and token can be added to help increase security and to help preserve data integrity. If a password is used, the password can be encrypted or unencrypted, and/or the password can be obscured to hide the actual default password digits.

The CDS 26 can forward the notification_SM message, at step 106, to the SMSC 28 that, in turn, can forward the message, at step 108, to the device 18. The device 18 receives the notification_SM message and generates an HTTP message get_headers that is sent to the CDS 26, at step 110. The get_headers message can include parameters such as the date, time, and calling line identity (CLI). The get_headers message can additionally include authentication information for IMAP sessions between the CDS 26 and VMS 24. At step 112, the CDS 26 initiates an IMAP session with the VMS 24. Accordingly, a TCP connection is established and the get_headers message is used to authenticate the session, after which the subscriber's voicemail box is accessed on the VMS 24 to retrieve the header information for the voicemail messages. The VMS 24 sends the headers to the CDS 26, at step 114. The CDS 26 forwards the headers to the device 18, at step 116. The device 18 uses the headers to determine the status of each message stored on the device 18 and identify any newly deposited messages. After the device 18 determines which message(s) needs to be retrieved, the device 18 generates and sends a message request, for example, an HTTP get_message request with the header information for the requested message(s), at step 118. At step 120, this message is received and the CDS 26 generates and sends an IMAP message_request, including the requested voicemail message header information, to the VMS 24. The VMS 24 processes the request and returns the requested message content in an IMAP message_response, at step 122. The CDS 26 then delivers the designated message content to the device 18, at step 124. Upon receipt of the message content, the device 18 stores the content under the appropriate header in a memory and permits the subscriber to access the content via a user interface, for example, a graphical user interface (GUI). The message content can be formatted using any audio CODEC, such as, but not limited to, adaptive multi-rate (AMR), AMR wideband (AMR-WB), or any other standardized or independent audio CODEC, including the CODECs 42 and audio formats described above with reference to FIG. 2.

In certain embodiments, an "if-modified-since" HTTP Message can be used to occasionally poll the VMS 24 for the Inbox voicemail message list and update any voicemail message "if-modified-since" the last update, for example, if a message was deleted, archived, or added at the device 18 or the VMS 24. This reduces the amount of data traversing the network thereby reducing network congestion. However, in some embodiments the header information is relatively small and as such no noticeable improvement may be available for sending only the modified voicemail message header.

In certain embodiments, more than one connection can be established to the VMS 24 or in some cases to multiple or redundant VMSs. This allows for simultaneous requests in order to serve a subscriber's request to view or listen to a message faster. In some other embodiments, messages are transferred to a device 18 upon receipt by the VMS 24. Load balancing techniques can also be implemented. In certain embodiments, message downloads that are interrupted, for example, via cancellation or connection failure, can be resumed starting at the last received byte. These embodiments assume the message is stored in full, at least temporarily, on the CDS 26. However, in some embodiments, the CDS 26 deletes the message after the message content is sent to the device 18. A subsequent request for one or more previously sent messages is facilitated by re-retrieving the message, re-transcoding the message, and sending the message to the device 18. In certain embodiments, requests to the CDS 26 can be pipelined in accordance with HTTP 1.1 specifications. This can reduce network latency for multiple requests.

Figure 5:
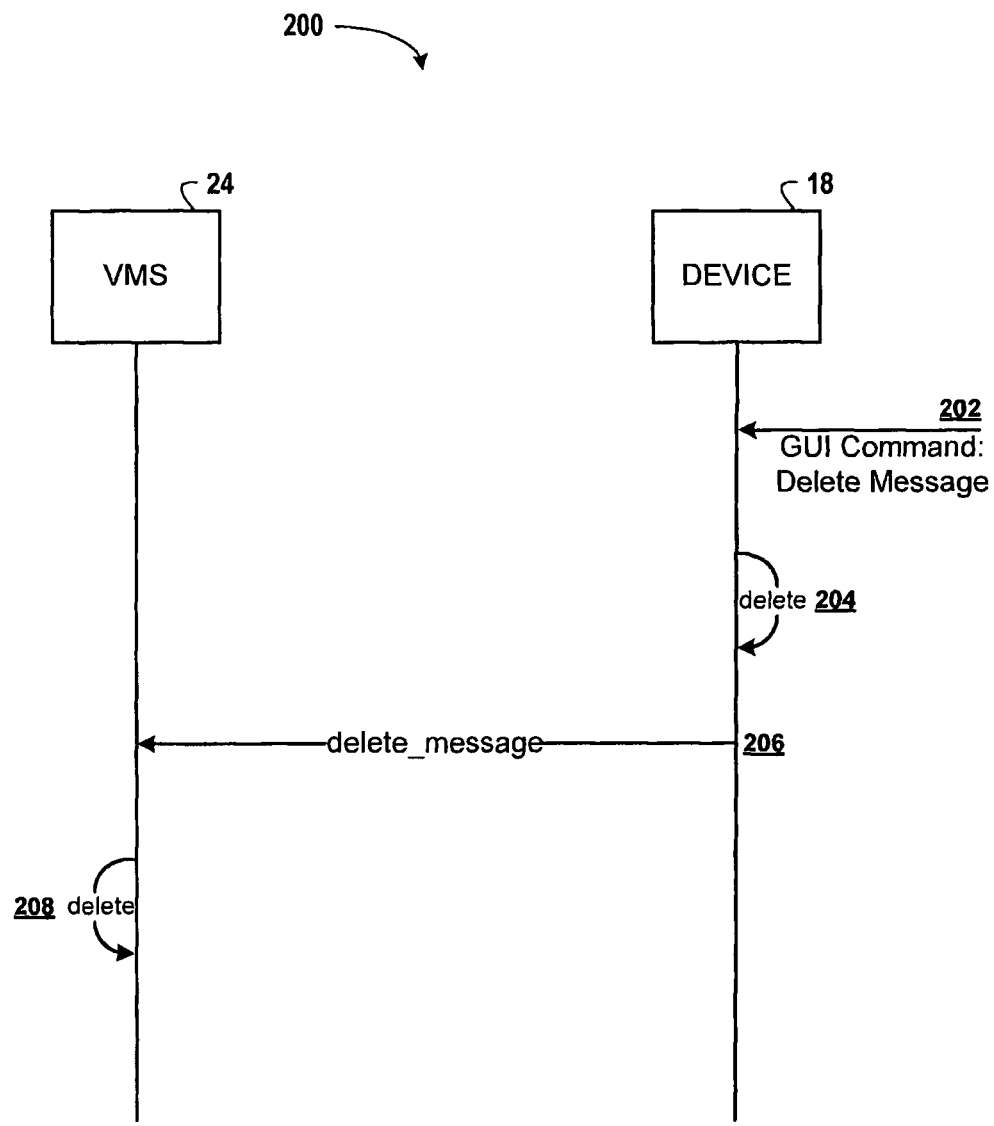
FIG. 5 is a call flow diagram illustrating an exemplary method for deleting a voicemail message from a device and from a voicemail system, according to an exemplary embodiment of the present disclosure.

FIG. 5 schematically illustrates an exemplary method 200 for deleting a message from a device 18 and the VMS 24, wherein the deletion of the message is initiated at the device 18. It should be understood that the steps described are not necessarily presented in any particular order and that performance of some or all of the steps in an alternative order(s) is possible and is contemplated. The steps have been presented in the demonstrated order for ease of description and illustration. Steps can be added, omitted and/or performed simultaneously without departing from the scope of the appended claims. Some or all steps of this process, and/or substantially equivalent steps, can be performed by execution of computer-readable instructions included on a computer readable medium.

In an attempt to simplify the description of the method 200, various network elements and nodes have been omitted from the illustrated call flow diagram. Similarly, messages and data are described in generic terms, though it will be appreciated that multiple message and data formats, as well as multiple message and data nodes, relays, and messaging platforms can be involved in any or all of the communications described herein.

As illustrated in FIG. 5, the method 200 can begin at step 202, whereat a delete message command is received at the device 18. The delete message command can be selected by a user, for example, through a graphical user interface (GUI) at the device 18. In the illustrated method, the device 18 stores messages, or copies thereof, in a local memory, for example, a memory 62. In the illustrated method 200, the device 18 deletes the selected message from the device memory 62, as illustrated by step 204. As illustrated by step 206, the device 18 can also send a delete_message request to the VMS 24. While it has been stated above, it is again stressed that the order of the illustrated steps is exemplary only, and that the steps can be performed in any order, or not at all. The delete_message request can include information relating to the designated message, for example, a reference to a message header or a portion thereof, and an instruction to delete the message from the VMS memory 36. The VMS 24 can delete the designated message from the VMS 24, as illustrated at step 208.

Figure 6:
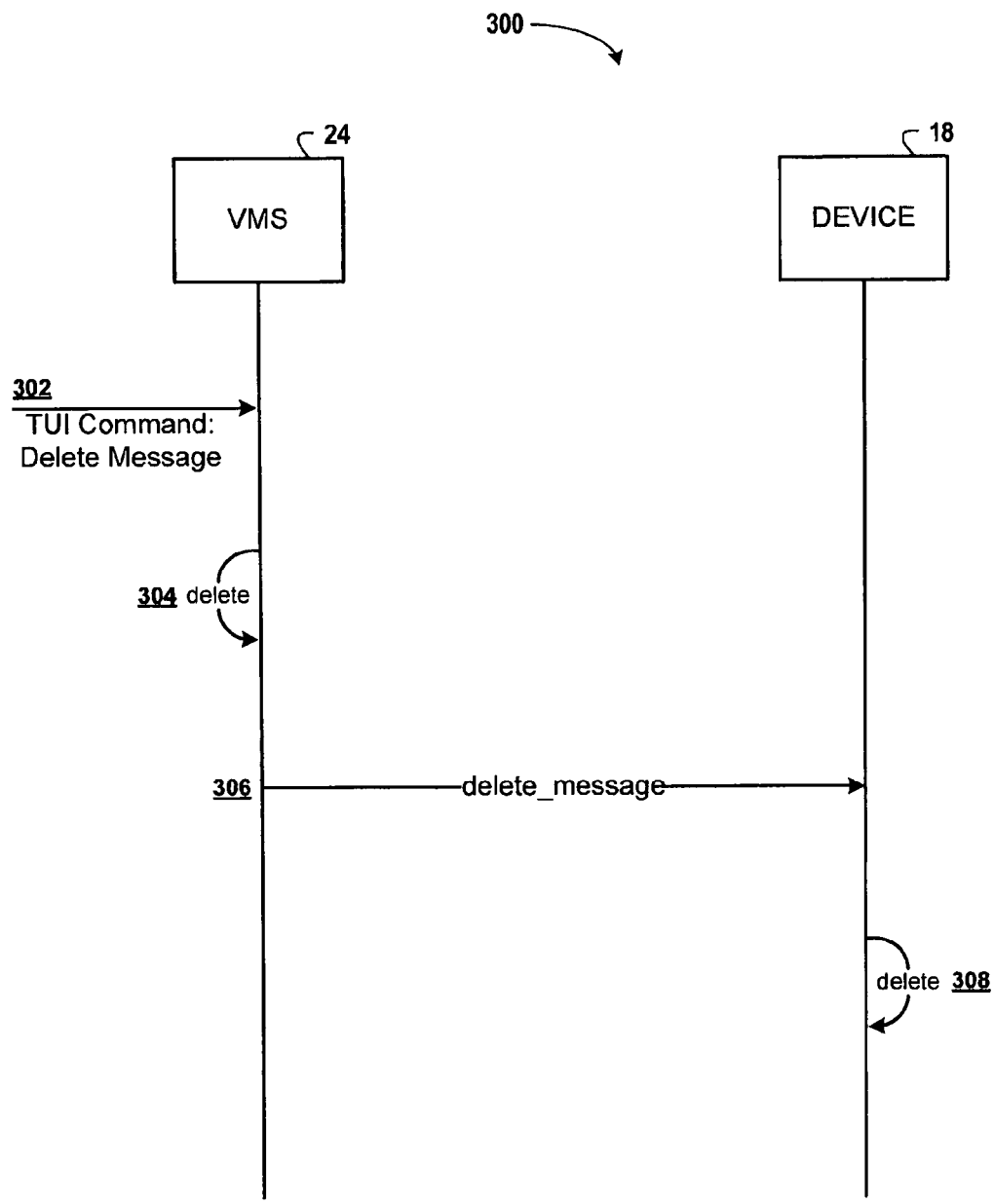
FIG. 6 is a call flow diagram illustrating an exemplary method for deleting a voicemail message from a voicemail system and from a device, according to an exemplary embodiment of the present disclosure.

FIG. 6 schematically illustrates an exemplary method 300 for deleting a message from the VMS 24 and a device 18, wherein the deletion of the message is initiated at the VMS 24. It should be understood that the steps described are not necessarily presented in any particular order and that performance of some or all of the steps in an alternative order(s) is possible and is contemplated. The steps have been presented in the demonstrated order for ease of description and illustration. Steps can be added, omitted and/or performed simultaneously without departing from the scope of the appended claims. Some or all steps of this process, and/or substantially equivalent steps, can be performed by execution of computer-readable instructions included on a computer readable medium.

In an attempt to simplify the description of the method 300, various network elements and nodes have been omitted from the illustrated call flow diagram. Similarly, messages and data are described in generic terms, though it will be appreciated that multiple message and data formats, as well as multiple message and data nodes, relays, and messaging platforms can be involved in any or all of the communications described herein.

As illustrated in FIG. 6, the method 300 can begin at step 302, whereat a delete message command is received at the VMS 24. The delete message command can be selected by a user, for example, through a telephone user interface (TUI) at the VMS 24. The VMS 24 deletes the designated message from the VMS memory 36, as illustrated by step 304. In the illustrated method, the device 18 also stores copies of the messages, in a memory 62. As such, the VMS 24 can send a delete_message request to the device 18, as illustrated at step 306. The delete_message request can include information relating to the designated message, for example, a reference to a message header or a portion thereof, and an instruction to delete the message from the device 18. The device 18 can delete the designated message from the device 18, as illustrated at step 308. While FIG. 6 depicts a system in which the device 18 and the VMS 24 both store messages, or at least copies thereof, it will be appreciated that a message can be forwarded to the device 18 upon receipt by the VMS 24. After forwarding the messages to the device 18, the VMS 24 can delete the message from the VMS memory 36. In some embodiments, messages are not stored at the VMS 24 unless a user decides to archive a message, at which time a copy of the archived message can be transferred to the VMS 24 and stored in the archive 56. These and other functions will be described below in more detail.

Figure 7:
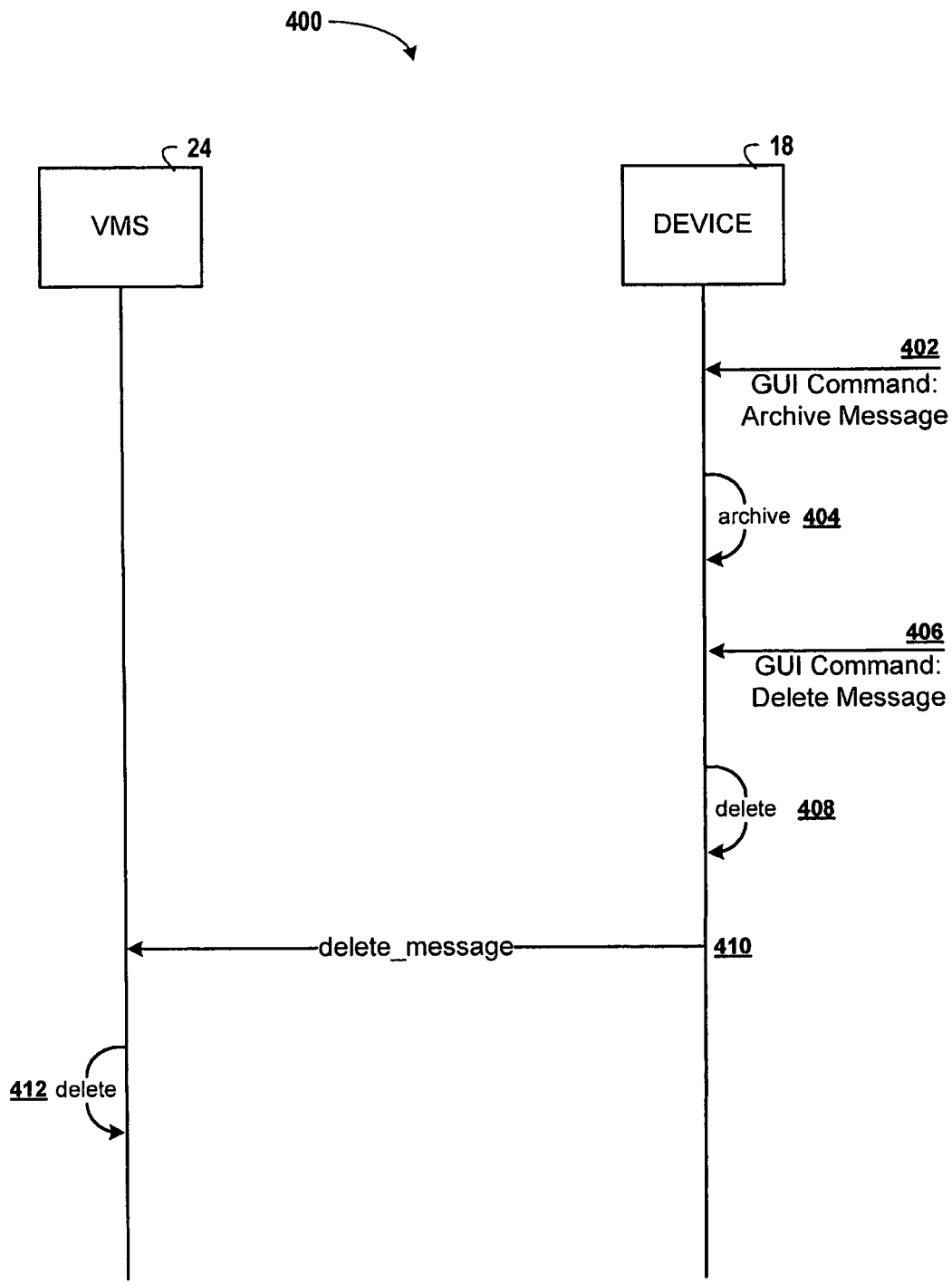
FIG. 7 is a call flow diagram illustrating an exemplary method for archiving a voicemail message at a device, according to an exemplary embodiment of the present disclosure.

FIG. 7 schematically illustrates an exemplary method 400 for archiving a message at a device 18, wherein the archival of the message is initiated at the device 18. FIG. 7 also schematically illustrates a message delete operation initiated at a device 18. It should be understood that the steps described are not necessarily presented in any particular order and that performance of some or all of the steps in an alternative order(s) is possible and is contemplated. The steps have been presented in the demonstrated order for ease of description and illustration. Steps can be added, omitted and/or performed simultaneously without departing from the scope of the appended claims. Some or all steps of this process, and/or substantially equivalent steps, can be performed by execution of computer-readable instructions included on a computer readable medium.

In an attempt to simplify the description of the method 400, various network elements and nodes have been omitted from the illustrated call flow diagram. Similarly, messages and data are described in generic terms, though it will be appreciated that multiple message and data formats, as well as multiple message and data nodes, relays, and messaging platforms can be involved in any or all of the communications described herein.

As illustrated in FIG. 7, the method 400 can begin at step 402, wherein the device 18 can receive a command to archive a designated message. The archive command selected by a user, for example, through selection of an "Archive" command at a GUI operated by the device 18. As illustrated at step 404, the device 18 can archive the selected message.

The term "archive," as used in the illustrated methods, in the description, and in the claims, includes various methods and systems for storing messages and preventing deletion of the messages. In some embodiments, an "archived" message is tagged with data that indicates that the message is to be treated as archived by the VMS 24. Such data tagging can include the placement of an "archived" tag in the message header. As such, a device 18 can recognize a message as archived by recognizing data in the message. As such, deletion of the message can be restricted or limited by the device 18 to prevent unintentional deletion. For example, the device 18 can require additional steps by the user to effect deletion of the message. In other embodiments, the archived messages can be effectively "sequestered" from the other messages, for example, stored in an alternative folder or memory 62. As such, a user may have to enter the archived message folder to view and/or delete an archived message. It will be appreciated that additional steps can be required before allowing deletion of an archived message regardless of whether the archived messages are stored in a separate folder, a separate memory location, and/or tagged as archived. For example, a user may be required to enter an additional password, PIN, a confirmation command, and/or other information to confirm deletion of an archived message.

If a message is archived by a user, there may be more than one copy of the message on the device 18, the VMS 24, or both. In the illustrated embodiment, a user can decide to delete the message from a voicemail interface at the device 18 at any point, as illustrated at block 406. The delete message command can be selected by a user, for example, through a GUI at the device 18. In the illustrated method 400, the device 18 deletes the selected message from the device memory 62, as illustrated by step 408. In the illustrated embodiment, the archived copy of the message is not deleted at step 408, and instead remains in the device memory 62 until the archived copy is deleted by a user. A voicemail application can be configured to require the user to enter an archived message folder to select and delete an archived message, to enter a verification code, to enter a password or PIN, and the like, to delete an archived message. Requiring such operations can be useful in protecting archived messages from unintended deletion.

As illustrated by step 410, the device 18 can also send a delete_message request to the VMS 24. The VMS 24 can delete the designated message, as illustrated at step 412 and explained above with reference to FIGS. 5 and 6. It will be appreciated that a user can decide to delete the archived message, at which time the message can be deleted from the device 18. Additionally, a user can decide to "restore" the deleted message from the archive, for example, by selecting an option to move or copy the archived message to the voicemail inbox. If a user decides to restore a deleted message, the device 18 can send the message content to the VMS 24 with instructions to place a copy of the message in the voicemail inbox, if desired. A message that is restored to the VMS 24 can appear as a new message, as a message that has already been retrieved, or as an archived message, according to a network, VMS, or user preference. It should be understood that some embodiments of the present disclosure allow message data at the VMS 24 to be decoupled from message data stored at the device 18, and/or vice versa. Decoupling message data at the VMS 24 and the device 18 can help relieve burden on the communications network 10, for example, by reducing network communications between the device 18 and the VMS 24. In some embodiments, message data is stored at a device 18, which can help relieve burden on the VMS 24, and/or the communications network 10 in general, by using the device memory 62 for storing the message data. As such, it should be appreciated that the device 18 may not update the VMS 24 when actions are taken at the device 18, for example, deletion of a message. The ability to decouple message data at the device 18 and the VMS 24 can be included in embodiments of other methods and systems described herein.

In FIG. 7, the archived message, as explained briefly above, can be stored indefinitely, until deletion by the user. The archival of messages can be continued independent of any action taken at the device 18 or at the VMS 24. As noted above with reference to FIGS. 5 and 6, it is considered advantageous to allow the VMS 24 and the device 18 to sync contents at desired intervals, upon occurrence of an update, or based upon other trigger events. Such functionality can obviate the need for a user to delete a message from a VMS 24 and a device 18 at which copies of a voicemail message are stored. As such, as illustrated in FIGS. 5 and 6, the deletion of a message at a VMS 24, for example, can trigger a message to the device 18 to delete a corresponding copy of the message stored at the device 18. Similar processes can be undertaken by a voicemail client at a device 18. The archive function can be used to allow permanent maintenance of the voicemail messages, irrespective of actions of the VMS 24. Exemplary actions that can be ignored by a voicemail archival application include the deletion of a message via a TUI or GUI, the automatic deletion of old messages from a VMS 24, and the like.

Figure 8:
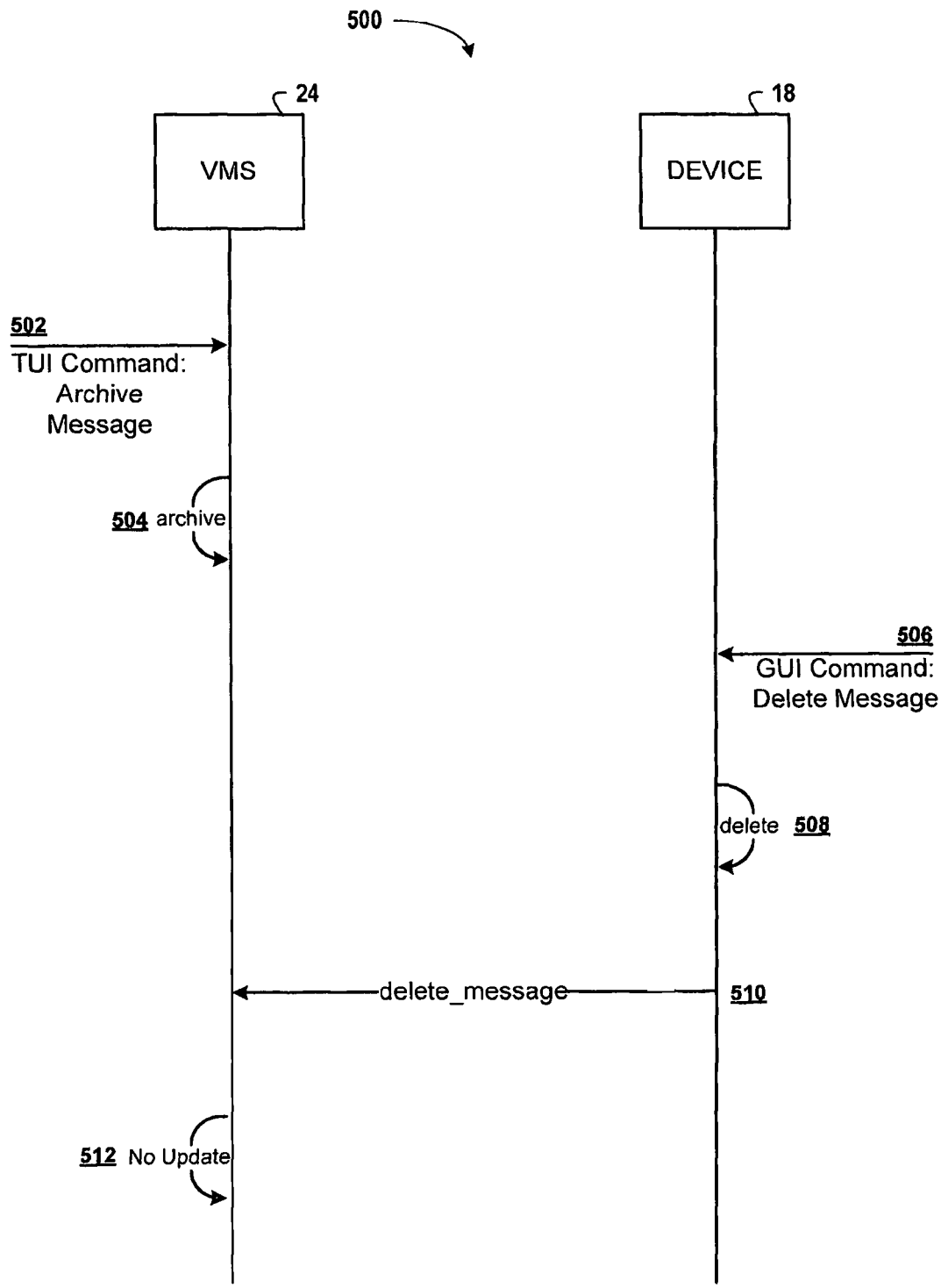
FIG. 8 is a call flow diagram illustrating an exemplary method for archiving a voicemail message at a voicemail system, according to an exemplary embodiment of the present disclosure.

FIG. 8 schematically illustrates an exemplary method 500 for archiving a message at a VMS 24, wherein the archival of a message is initiated at the VMS 24. FIG. 8 also schematically illustrates a method for deleting a message at a device 18. It should be understood that the steps described are not necessarily presented in any particular order and that performance of some or all of the steps in an alternative order(s) is possible and is contemplated. The steps have been presented in the demonstrated order for ease of description and illustration. Steps can be added, omitted and/or performed simultaneously without departing from the scope of the appended claims. Some or all steps of this process, and/or substantially equivalent steps, can be performed by execution of computer-readable instructions included on a computer readable medium.

In an attempt to simplify the description of the method 500, various network elements and nodes have been omitted from the illustrated call flow diagram. Similarly, messages and data are described in generic terms, though it will be appreciated that multiple message and data formats, as well as multiple message and data nodes, relays, and messaging platforms can be involved in any or all of the communications described herein.

As illustrated in FIG. 8, the method 500 can begin at step 502, whereat the VMS 24 can receive a command to archive a designated message. The archive command selected by a user, for example, through selection of an archive command at a TUI or other user interface run by, at, or for the VMS 24. As illustrated at step 504, the VMS 24 can archive the selected message. The archived message, as described above with reference to FIG. 7, can be stored indefinitely, until deletion by the user, irrespective of any action taken at the device 18 or at the VMS 24. In some embodiments, the storage of the archived messages can continue indefinitely unless some designated intentional deletion operation is performed by a user, thereby denoting that the user wishes to delete the archived message. Such options, if included, can be tailored by users, network operators, or other authorized parties. The remainder of FIG. 8 illustrates a hypothetical situation in which a user decides to delete a message after archival at the VMS 24.

As shown at step 506, a user can enter a command to delete a message at the device 18. The delete message command can be selected by a user, for example, through a GUI at the device 18. In the illustrated method 500, the device 18 deletes the selected message from the device memory 62, as illustrated by step 508. The device 18 can then send a "delete_message" notification to the VMS 24 to delete the message, as illustrated at step 510. However, the archived copy of the message is not deleted at step 512, and can remain in the VMS memory 36 until it is deleted by a user.

It will be understood that archival of a message can prompt the VMS 24 or the device 18 to create a copy of the message. The copy of the message can be moved to an archive 56, tagged as archived, or placed in a special directory, location, server, or the like, if desired. In some of the embodiments in which archival of a message prompts the creation of a message copy, the receipt of a "delete_message" as illustrated in step 510 of FIG. 8 can prompt the VMS 24 to delete any copies of the archived message out of the message inbox, for example. The archived copy of the message, however, can be stored until explicitly deleted, as explained above with respect to FIG. 7.

Figure 9:
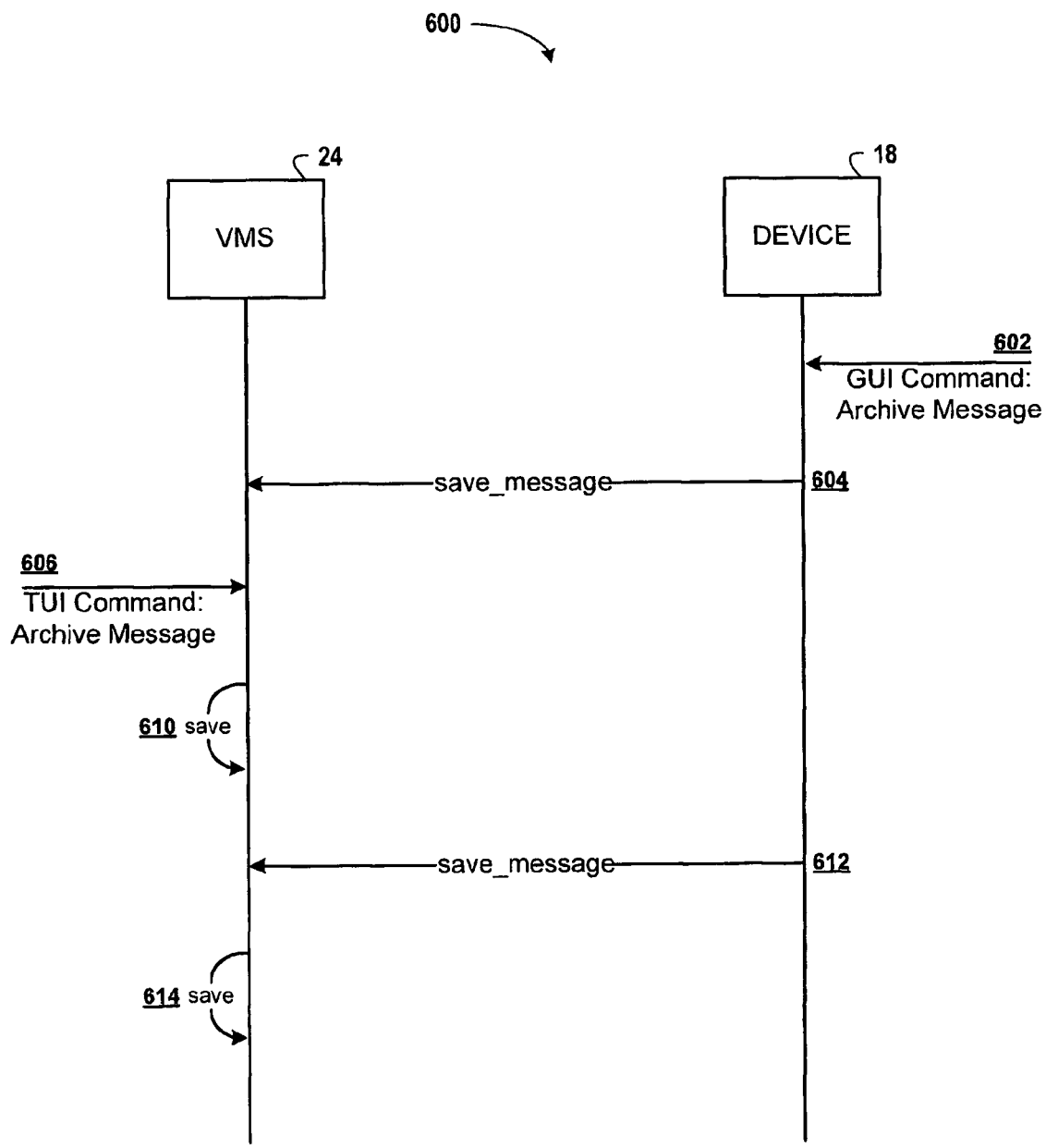
FIG. 9 is a call flow diagram illustrating an exemplary method for archiving a voicemail message at a voicemail system, initiated at a network element, or at a device, according to an exemplary embodiment of the present disclosure.

FIG. 9 schematically illustrates a method 600 for archiving a message, according to an alternative embodiment of the present disclosure, wherein the command to archive a message is received at a device 18. FIG. 9 also illustrates the method 600, wherein the command to archive a message is received at the VMS 24. It should be understood that the steps described are not necessarily presented in any particular order and that performance of some or all of the steps in an alternative order(s) is possible and is contemplated. The steps have been presented in the demonstrated order for ease of description and illustration. Steps can be added, omitted and/or performed simultaneously without departing from the scope of the appended claims. Some or all steps of this process, and/or substantially equivalent steps, can be performed by execution of computer-readable instructions included on a computer readable medium.

In an attempt to simplify the description of the method 600, various network elements and nodes have been omitted from the illustrated call flow diagram. Similarly, messages and data are described in generic terms, though it will be appreciated that multiple message and data formats, as well as multiple message and data nodes, relays, and messaging platforms can be involved in any or all of the communications described herein.

As illustrated in FIG. 9, the method 600 can begin at step 602, whereat the device 18 can receive a command to archive a designated message. The archive command can be selected by a user, for example, through selection of an archive command at a GUI operated by the device 18. As illustrated at step 604, the device 18 can send a "save_message" notification to the VMS 24.

Alternatively, the method 600 can begin at step 606, wherein the VMS 24 receives a command to archive a designated message. In the illustrated embodiment, the VMS 24 can receive a command to archive a designated message by the selection of an option to archive a designated message at a TUI, or by receiving a "save_message" command, as illustrated and described at step 604.

As illustrated at step 610, the VMS 24 saves the selected or designated message. The message save operation illustrated at step 610 can be performed in a manner substantially similar to a save operation performed by many traditional voicemail systems, visual voicemail systems, and the like. In the illustrated embodiment of FIG. 9, saving a message at the VMS 24 can also prompt the VMS 24 to set and initiate a timer for the message, the expiration of which will prompt the VMS 24 to delete the message from the VMS memory 36. If the archive command is selected at the device 18, as shown at step 602, the device 18 can automatically send a "save_message" command at a specified interval, as illustrated at step 612. Upon receipt of the "save_message" command, the VMS 24 can save the designated message again, thereby re-starting the time for which the message will be stored, as illustrated at step 614. It will be appreciated that the save and re-save functionality can be performed by the VMS 24, without input from the device 18, in which case the VMS 24 will re-save the message at a designated interval to prevent removal of a designated message from the VMS 24. For example, the archive command can be entered at the VMS 24, for example, by a user accessing the VMS 24 through a TUI or other user interface. The VMS 24 can include functionality that re-saves the selected message at some designated interval to prevent removal of the message from the VMS 24. In another embodiment, the archive command is selected at a device 18 and the archive command is passed to the VMS 24. The VMS 24 then implements a process to re-save the message at a designated interval to prevent deletion of the designated message. In still other embodiments, an archival module (not illustrated) can be used to archive messages at the VMS 24. An archival module can reside on the network 10, the device 18, or a combination thereof, and can be hardware, software, and/or a combination thereof. The selection of the archival command at the VMS 24 or at the device 18 can pass instructions to the archival module. The instructions can command the archival module to archive one or more designated messages. The archive module can then connect to the VMS 24 or the device 18, authenticate as the user or the device 18, and save the designated message at designated intervals.

Figure 10:
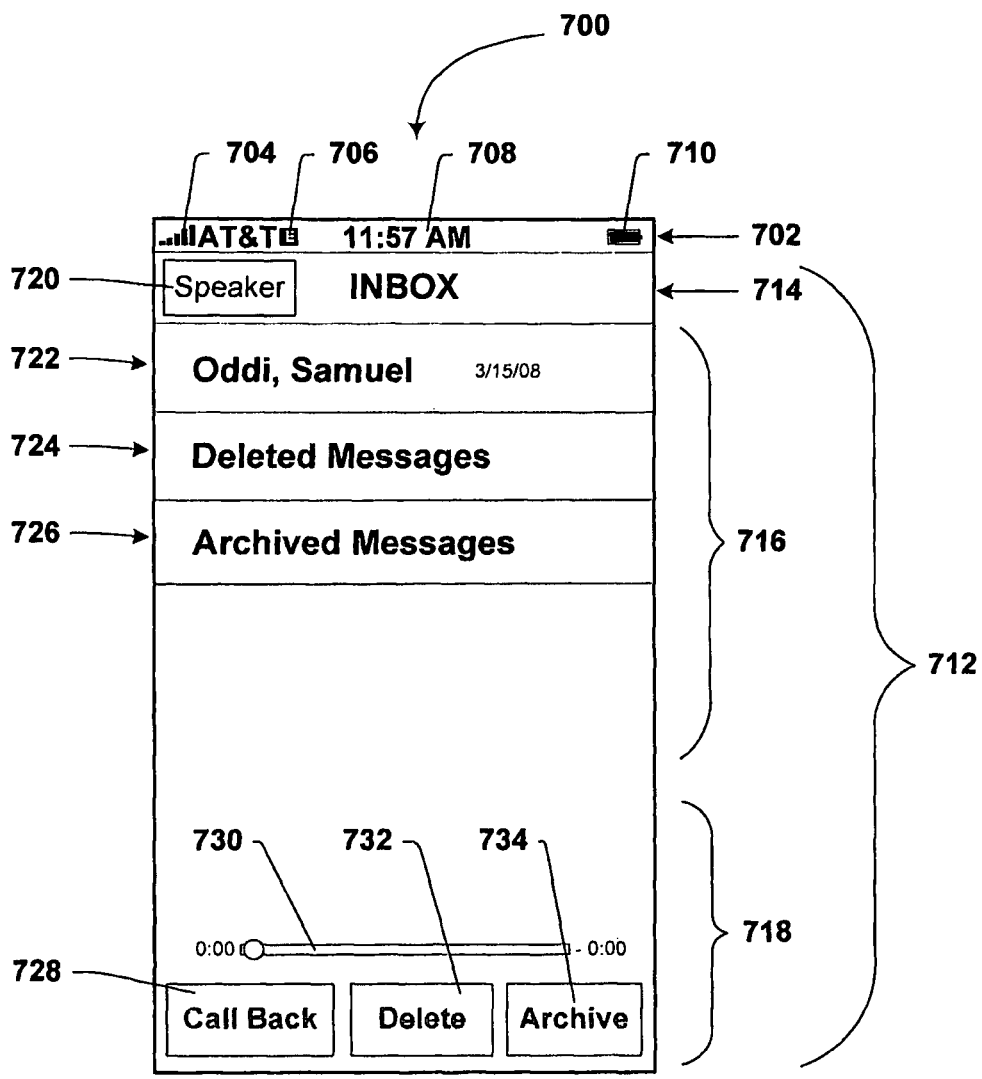
FIG. 10 illustrates an exemplary graphical user interface (GUI) for a voicemail management client including an option for a user to archive voicemail messages, according to an exemplary embodiment of the present disclosure.

FIG. 10 illustrates an exemplary representative image from a GUI 700 for a device 18, according to an exemplary embodiment of the disclosure. As illustrated, the GUI 700 can include operational information 702 for the device 18. The operational information 702 can include network information, for example, a signal meter 704 for displaying the measured strength of a network signal, and a network indicator 706 for displaying the current network to which the device 18 is connected. In the illustrated GUI 700, the device 18 is indicating a maximum signal strength and that the device 18 is currently connected to the AT&T EDGE (Enhanced Data rates for GSM Evolution) network. It should be understood that this indication is exemplary only since the GUI 700 can be used on devices operating on other networks and operated by other carriers. The operational information 702 can also include, for example, the time of day 708, a battery meter 710, as well as other indicators, including, but not limited to, a short range radio communications device indicator, an alarm indicator, a date, and the like.

In the illustrated GUI 700, an exemplary visual voicemail application user interface (VVMAUI) 712 is currently displayed. The reader is reminded that the methods and systems described herein are not limited to visual voicemail systems. Rather, the VVMAUI 712 is illustrated to simplify description of the concepts disclosed herein. The illustrated VVMAUI 712 includes a title and/or menu portion 714, a mailbox contents portion 716, and a control portion 718. As illustrated, the title and/or menu portion 714 can include one or more options 720, if desired, though the illustrated options are merely exemplary. The mailbox contents portion 716 can display one or more messages 722, an option 724 to view deleted messages, an option 726 to view archived messages, as well as other options (not illustrated). The control portion 718 can include one or more controls, if desired. The illustrated control portion 718 includes a callback option 728, a time slider bar 730, a delete option 732, and an option 734 to archive a message 722. In the illustrated GUI 700, the control portion 718 is illustrated as being in a deactivated state. In the exemplary illustrated GUI 700, the control portion 718 can be activated when a desired message is selected for review by the user.

In some embodiments, the GUI 700 is controlled by using buttons, soft-buttons, joysticks, switches, wheels, or the like on a device keypad. In other embodiments, the voicemail client is run using an input/output device operatively connected to the device 18. In other embodiments, the GUI 700 also functions as a touch-sensitive input device for accepting user input, whereby a user can touch the screen at a desired option to enter a command corresponding to the selected option. In still other embodiments, a combination of input devices are used to make desired selections. These and other embodiments are included in the scope of the appended claims.

Selection of the illustrated "Archive" option 734 can instruct the device to archive the selected message. Archival of messages can be accomplished in a number of ways, as explained above. For example, selection of the "Archive" option 734 can instruct the device to send a message to the VMS 24 requesting archival of the selected message, as was explained above with reference to FIG. 7. In other embodiments, all voicemail messages are stored locally, in a device memory 62. A message designated for archival can be tagged with header data that indicates to the device 18 that the message is to be stored until deleted by the user. Additionally, or in the alternative, an archived message can be stored in a special memory location to prevent inadvertent deletion without the addition of additional header data. In other embodiments, archival of a message can result in a "save" command being sent to the VMS 24 to save a message, whereby a timer can be intitiated, the expiration of which allows the VMS 24 to delete the message. The VMS 24 or the device 18 can resend the "Save" command at intervals that will prevent expiration of the timer, thereby preventing deletion of the message. Other embodiments are contemplated and are included in the scope of the appended claims. Regardless of the method used to archive messages, the device 18 knows which messages are archived and allows a user to review the archived messages as desired.

Figure 11:
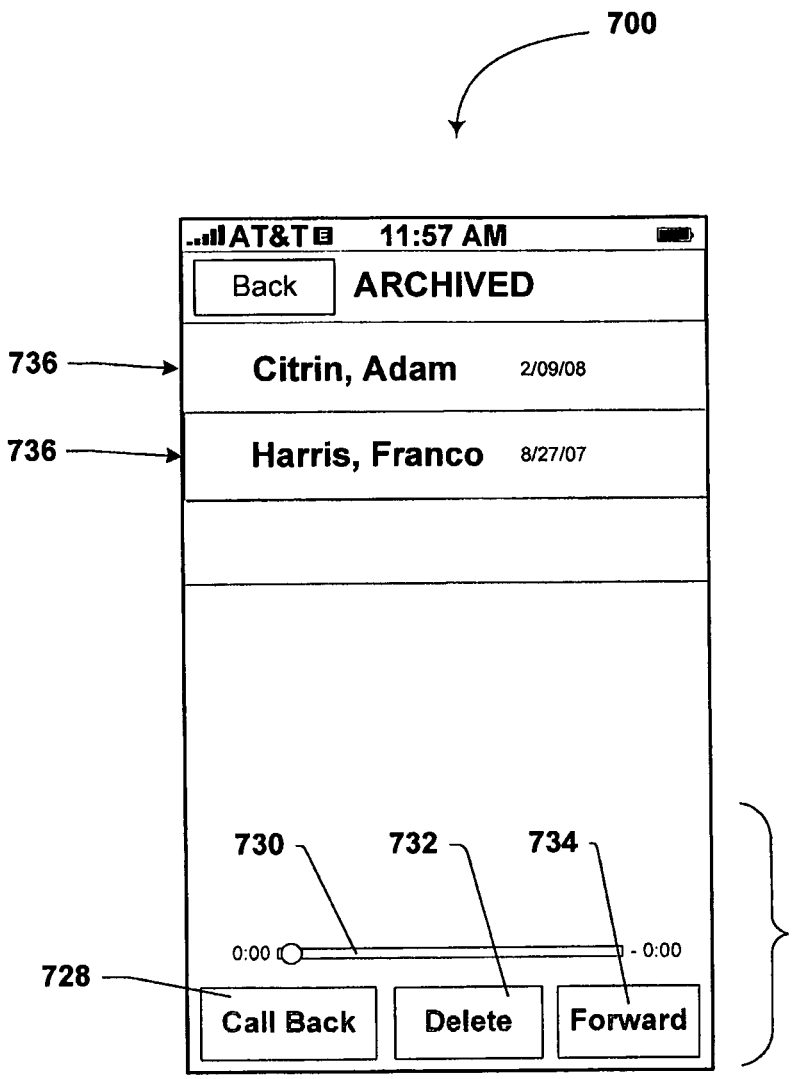
FIG. 11 illustrates another exemplary GUI for a voicemail management client allowing a user to view archived messages and giving the user an option to forward voicemail messages, according to an exemplary embodiment of the present disclosure.

FIG. 11 illustrates another exemplary representative image from a GUI 700 for a device 18, according to an exemplary embodiment of the disclosure. In FIG. 11, the user has entered the archived messages box, in which two messages 736 are represented as being archived. As explained above, the messages 736 can be stored on a network element and the device 18 can provide the user with an indication that the messages are archived. It should be understood that the two messages 736 may have been selected for archival by the user, may have been automatically archived by the device 18, automatically archived by the VMS 24, or otherwise noted as being archived. If the user selected to archive the messages 736 at the device 18, the user may have used an archive option that is substantially similar to the illustrated archive option 734 of FIG. 10. The messages 736 depicted in FIG. 11 may be stored in a device memory 62, on a network element, in the VMS memory 36, in the VMS archive 56, or in an alternative memory location at the device 18, the VMS 24, the communications network 10, at a combination of locations, and the like.

Figure 12:
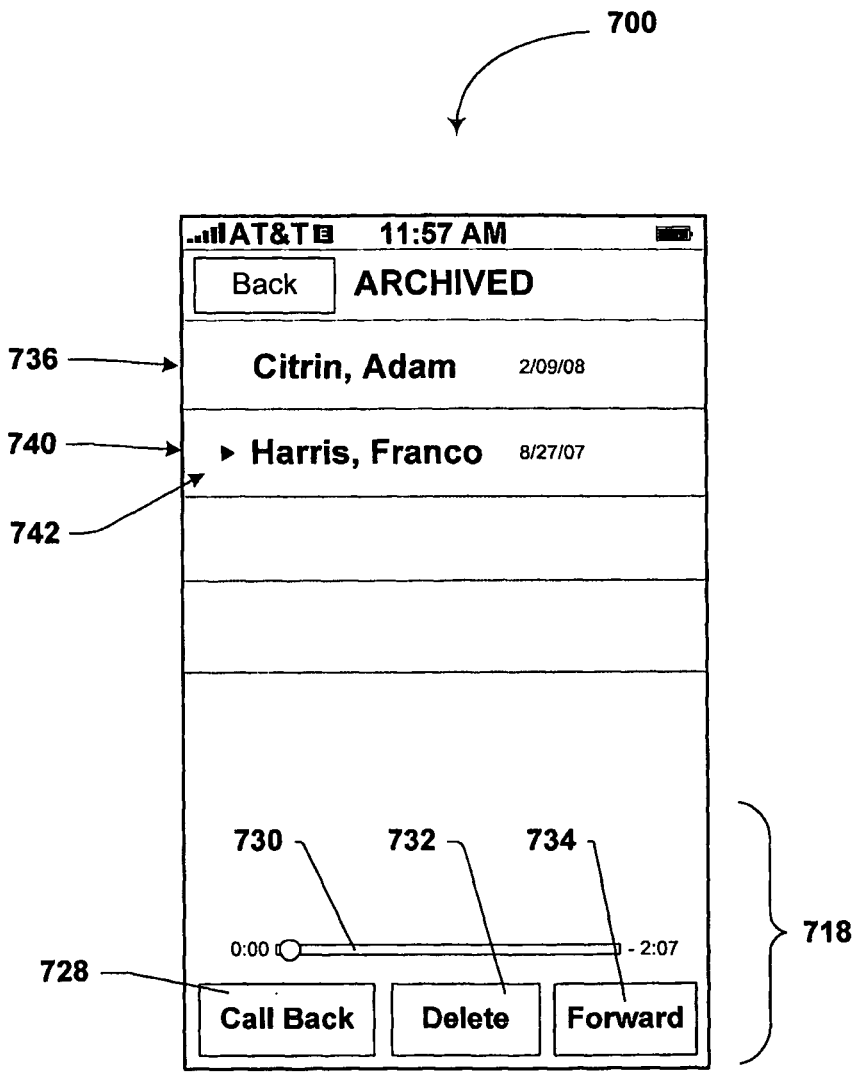
FIG. 12 illustrates another exemplary GUI for a voicemail management client allowing a user to view archived messages and giving the user an option to forward voicemail messages, according to an exemplary embodiment of the present disclosure.

FIG. 12 illustrates another exemplary representative image from a GUI 700 for a device 18, according to an exemplary embodiment of the disclosure. In the illustrated GUI 700, the user has selected a message 740, which is illustrated as highlighted. Since the user has selected a message 740 for review, the control portion 718 is illustrated as being in an activated state. The time slider bar 730 shows the length of the selected message 740. As illustrated, the selected message 740 is currently at the 0:00 position and 2 minutes and 07 seconds (2:07) remain in the selected message 740. In the illustrated GUI 700, an option 742 to play the selected message 740 appears to the left of the selected message 740. It is noted that the appearance of the unselected message 736 can be substantially similar to the appearance of an unselected message 736 illustrated in FIG. 11.

In FIG. 12, the GUI 700 includes other exemplary controls, for example, a callback option 728, a delete option 732, and a forward option 734. The callback option 728 allows a user to place a phone call to the number from which the message was left. The delete option 732 allows the message to be deleted from the archive. It will be appreciated that selection of a delete option from the archive can prompt the device 18 to obtain additional instructions from the user. For example, the device 18 may prompt the user to instruct the device 18 whether to delete the message permanently, to move the message back to the inbox, or the like. The illustrated forward option 734 can be used to forward the selected message. The message can be converted to alternative formats or forwarded without conversion. A basic conversion and forward method is described in more detail below with reference to FIG. 15.

Figure 13:
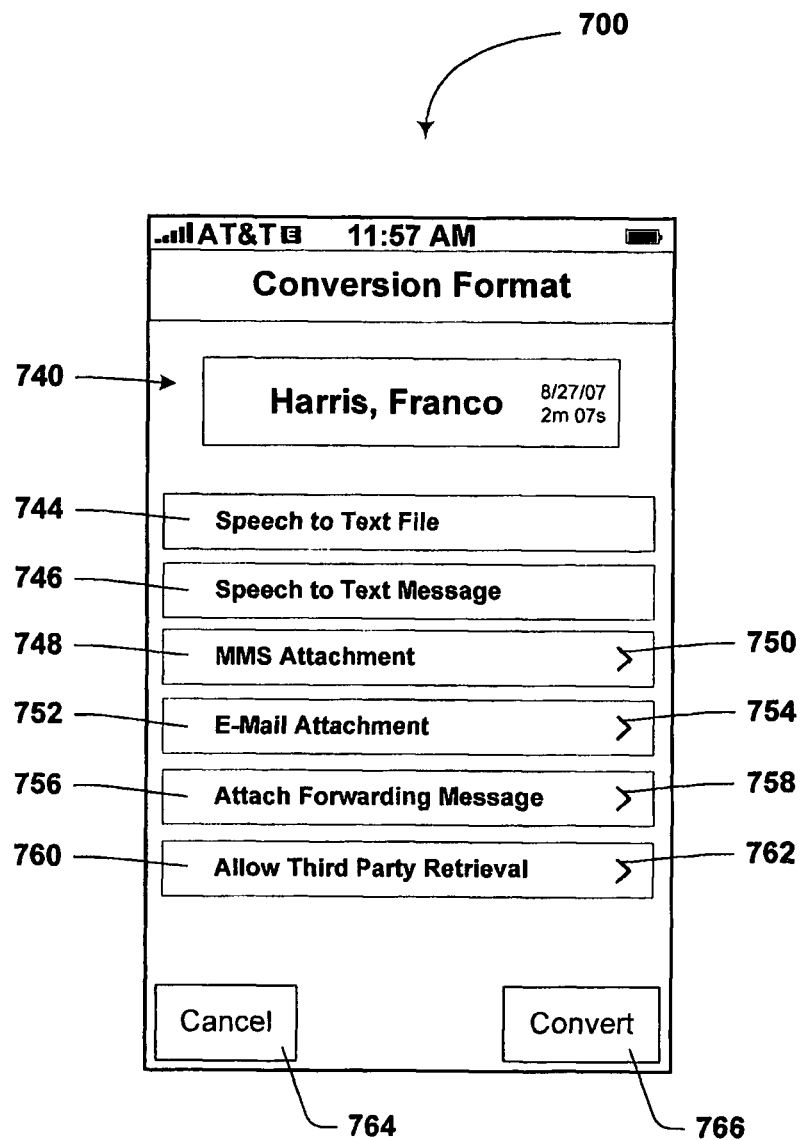
FIG. 13 illustrates an exemplary GUI for providing an option for a user to designate a conversion format and a forwarding method for a forwarded voicemail message, according to an exemplary embodiment of the present disclosure.

FIG. 13 illustrates another exemplary representative image from a GUI 700 for a device 18, according to an exemplary embodiment of the disclosure. In FIG. 13, the user has selected the forward option 734 illustrated in FIG. 12 to forward the selected message 740. In this embodiment, selection by the user of the forward option 734 prompts the user to select a desired delivery method for the forwarded message. The illustrated GUI 700 includes options to convert the message to one or more of several possible formats, and to select a delivery method. It should be understood that the illustrated conversion formats and delivery methods are exemplary only. Furthermore, it will be understood that the conversion and forwarding options are both optional, and that one, both, or neither of the options can be included as options for selection by a user.

In the illustrated GUI 700, the selected message 740 is displayed at the top of the image, and a number of options are presented to the user for selection. The illustrated GUI 700 includes an option 744 to convert the selected message audio to text. The speech to text option 744 can be used to convert a spoken message to readable text. The readable text can be stored as a text file at the device or at a network element and forwarded as an attachment to an email or MMS message. Alternatively, the text file can be stored at a network element for retrieval by a third party or third party device.

The illustrated GUI 700 also includes an option 746 to convert an audio message from speech to text message(s). Selection of the speech to text message option 746 can prompt the device 18 to convert a spoken message to text and forward the readable text to a designated recipient as one or more text messages. The text messages can be sent using, for example, short message service (SMS) protocol. Other options are contemplated and possible.

The illustrated GUI 700 also includes an option 748 to send the message 740 as an MMS attachment. Selection of the MMS attachment option 748 can create a new MMS message with an audio, video, or text file attachment. The user can enter one or more recipients of the MMS message. As illustrated, the MMS attachment option 748 can include an option 750 to enter a submenu through which additional options can be presented to the user. In one embodiment, the submenu prompts the user to select a desired conversion format for the message attachment. In another embodiment, the submenu prompts the user to designate one or more recipients and the device 18, or a network element, determines the proper delivery format of the MMS attachment. In still another embodiment, the submenu includes a combination of these and other options.

The illustrated GUI 700 also includes an option 752 to send the message 740 as an email attachment. Selection of the email attachment option 752 can create a new email message with an audio, video, or text file attachment. The user can enter one or more recipients of the email message, as is known. As illustrated, the email attachment option 752 can include an option 754 to enter a submenu through which additional options can be presented to the user. In one embodiment, the submenu prompts the user to select a desired conversion format for the message attachment. In another embodiment, the submenu prompts the user to designate one or more recipients and the device 18, or a network element, determines the proper delivery format of the email attachment. In still another embodiment, the submenu includes a combination of these and other options.

The illustrated GUI 700 also includes an option 756 to attach a forwarding message to the forwarded message 740. A forwarding message can include a standard or custom greeting that can be sent with the forwarded message 740. In some embodiments, the user records or designates a custom greeting introducing the user to the one or more recipients of the forwarded message 740. In some embodiments, the forwarding message is joined to the forwarded message 740 to create a single audio, video, or text file. In other embodiments, the forwarding message and the forwarded message 740 are sent as separate files in one or more file formats. The forwarding message can be a standard message, a recording tailored to the forwarded message 740, a default message, and the like. It will be appreciated that if the user sends the forwarded message 740 as an email or MMS attachment, that the user can use the body of the email or MMS message as the forwarding message. However, if desired, the user can attach a forwarding message instead of, or in addition to, the body of the email or MMS message, for example. As illustrated, the attach forwarding message option 756 can include an option 758 to enter a submenu through which additional options can be presented to a user. For example, a submenu can allow the user to select a prerecorded forwarding message, to record a custom message for a forwarded message 740, to select or enter a text message, to select an option to join the forwarding message and the forwarded message as a single file, other options, combinations thereof, and the like.

The illustrated GUI 700 also includes an option 760 to allow a third party to retrieve the "forwarded" message 740. The third party retrieval option 760 allows a user to authorize retrieval by one or more third parties. The message can be stored at the device 18, at the VMS 24, or at another element on a communications network 10. The third party retrieval option 760 can include an option 762 to enter a submenu through which additional options can be presented to a user. For example, a submenu can allow the user to designate one or more third parties who are authorized to retrieve the message 740. Additionally, the submenu can allow a user to designate a medium through which the forwarded message 740 can be retrieved. In some embodiments, the third party retrieval option 760 will move the forwarded message 740 to a location and send a link to the third party. The third party can retrieve the forwarded message 740 from the location designated by the forwarded link. In other embodiments, the third party retrieval option 760 sends retrieval information to the one or more third parties. The retrieval information can include a telephone number and an access code, through which the one or more third parties can connect to the VMS 24 and retrieve the forwarded message 740. Other options and combinations of options can be included in the submenu, if desired.

The illustrated GUI 700 also includes a cancel option 764, through which the user can cancel the conversion and/or the forwarding process. The cancel option 764 can be a selectable option, or can correspond to a soft key on a device keypad, for example. The GUI 700 can also include a convert option 766. In some embodiments, selection of any or all of the exemplary illustrated options 744-762 can prompt the device 18 to begin performing the selected operation. In other embodiments, the user can select a desired option 744-762 and then select the convert option 766, after which the device can begin converting the forwarded message 740 in accordance with the selected option 744-762.

Figure 14:
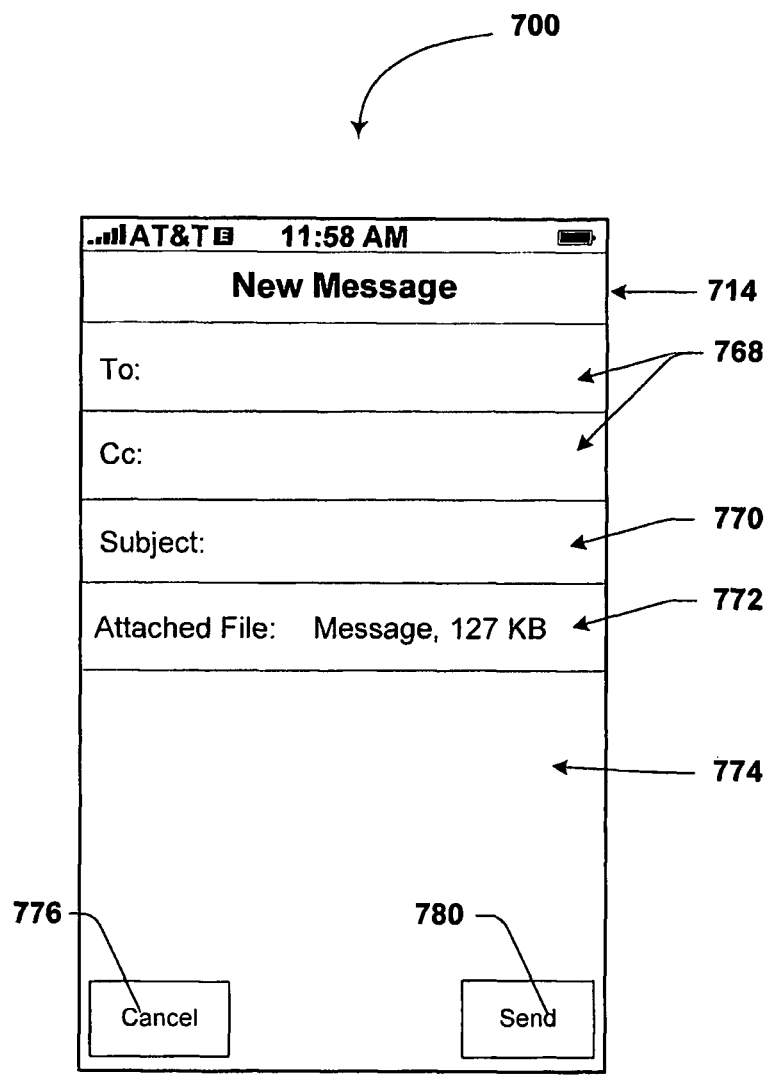
FIG. 14 illustrates an exemplary GUI interface for forwarding a voicemail message, according to an exemplary embodiment of the present disclosure.

FIG. 14 illustrates another exemplary representative image from a GUI 700 for a device 18, according to an exemplary embodiment of the disclosure. The illustrated GUI 700 is an exemplary embodiment of an email program for forwarding a forwarded message 740 as an email attachment. FIG. 14 is merely illustrative of an exemplary GUI 700 that could result from the selection of the email attachment option 752 of FIG. 13, for example. The illustrated GUI 700 includes one or more address fields 768, a subject line 770, an attachment line 772, and a message body portion 774. It will be appreciated some or all of the address fields 768, the subject line 770, the attachment line 772, and the message body portion 774 can be automatically populated by the device 18, or an application running thereon.

The GUI 700 is illustrated as including a cancel option 776, the selection of which can cancel the forwarding of the forwarded message 740. The illustrated GUI 700 also includes a send option 780, the selection of which prompts the device 18 to attempt delivery of the forwarded message 740. It will be appreciated that additional or alternative options are possible and contemplated. As was explained above, the cancel option 776 and the send option 780 can be selectable using a touch-sensitive screen, a joystick, softkeys, and the like. While the illustrated embodiment illustrates the forwarded message as attached to the outgoing email message as a file, it will be appreciated that the forwarded message 740 can be converted to text and attached to or can be an SMS message, an MMS message, an email message, a text file, and the like.

Figure 15:
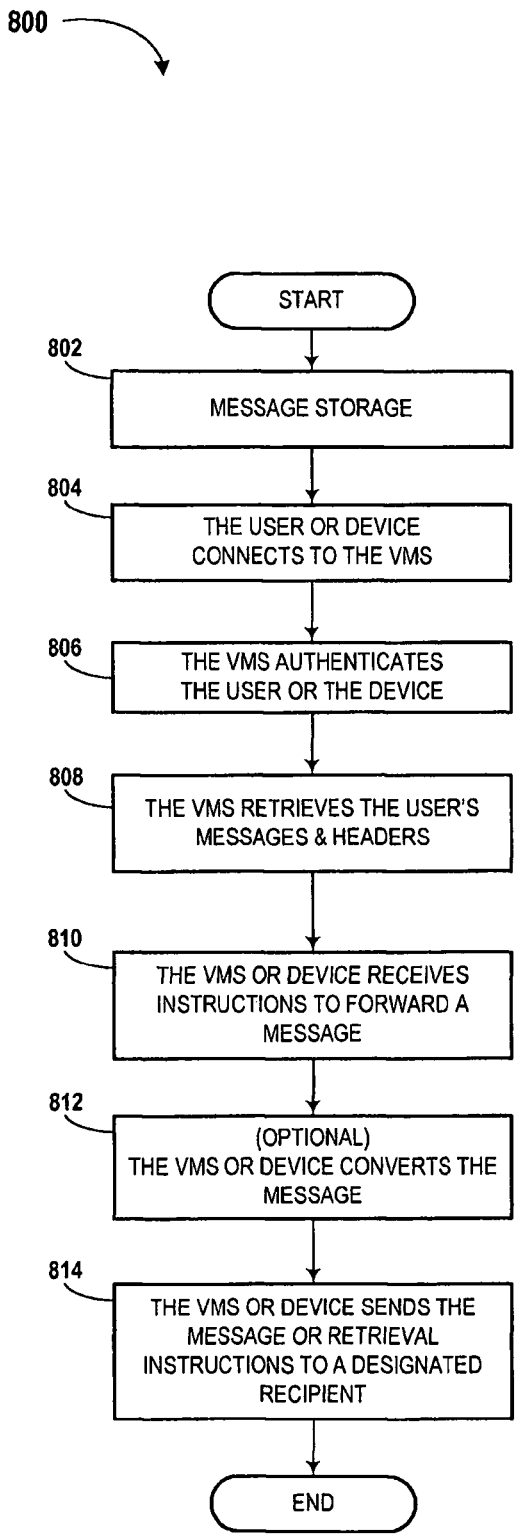
FIG. 15 schematically illustrates an exemplary method for forwarding voicemail messages, according to an exemplary embodiment of the present disclosure.

FIG. 15 schematically illustrates an exemplary method 800 for optionally converting and forwarding a voicemail message according to several exemplary embodiments of the disclosure. It should be understood that FIG. 15 illustrates in general terms an exemplary method for optionally converting and forwarding voicemail messages as conversion and forwarding functions can be included in a VMS 24 made in accordance with exemplary embodiments of the present disclosure. The steps of the method 800 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 800 can be ended at any time. Some or all steps of this process, and/or substantially equivalent steps, can be performed by execution of computer-readable instructions included on a computer readable medium.

As illustrated in block 802, a VMS 24 can store one or more messages. As explained above with reference to FIG. 2, the message 54 can include various types of data, including, but not limited to, audio data, video data, headers, text, and the like, and that the VMS 24 can correlate the various data, if desired, to represent a message. It will be appreciated that the message storage referred to with reference to block 802 can occur any number of times, or not at all, before a user of the VMS 24 retrieves any messages. Additionally, it will be appreciated that voicemail setup and configuration of mailbox preferences, and the like, are not illustrated for the sake of brevity, though such steps can occur at any time.

As illustrated in block 804, a user or the device 18 can connect to the VMS 24. A user or the device 18 can connect to the VMS 24 by a voice connection, by a data connection, or over the internet, for example. Once the user or the device 18 connects to the VMS 24, the VMS 24 can authenticate a user or the device 18 to determine if the user or the device 18 is authorized to access the requested mailbox, as illustrated in block 806. Although not illustrated, a user or the device 18 may be given several attempts to authenticate to the VMS 24, or the VMS 24 can terminate a call after an unsuccessful authentication attempt. For the remainder of the illustrated method 800, it will be assumed that the user or the device 18 authenticates successfully to the VMS 24.

As illustrated in block 808, the VMS 24 can retrieve one or more messages for the user or the device 18. In some embodiments, the user's device 18 connects to the VMS 24 and retrieves only the message headers. If a user selects a particular message, the message content, for example, the audio, video, text, or other data, can be retrieved by the user's device 18, as explained above with reference to FIG. 2. In some other embodiments, the user's device 18 can retrieve all of the data for all of the messages received at the VMS 24. In still other embodiments, the data for messages remains on the VMS 24 during a message retrieval by a user or the device 18. In still other embodiments, the VMS 24 includes hardware, software, or a combination thereof, at the device 18. At any time, any of the messages can be archived, as explained above in detail.

At block 810, the VMS 24 can receive instructions to forward one or more archived messages, or portion(s) thereof. The instructions to forward a message can be received in a number of ways. For example, a voice command, a DTMF tone, a data message, or the like, corresponding to a desired action, can be passed to and executed by the VMS 24 or the device 18. It should also be appreciated that a device 18 can include a GUI for presenting options to a user and for receiving the user's option selection. When a user makes a selection, the device 18 can implement the selected option or pass data corresponding to the selected option to the VMS 24 for execution. In the illustrated method 800, the user has indicated that one or more messages are to be forwarded to a recipient. The instructions to forward the message can optionally include contact information for a designated recipient, or the exemplary method 800 can optionally include prompting a user or the device 18 to select or designate a recipient. Alternatively, the VMS 24 can optionally be configured to forward messages to a default address, for example, the user's email address, or the user's device 18.

At block 812, the VMS 24 can optionally convert one or more messages, or portion(s) thereof, into a desired or designated format, as was explained above with reference to FIG. 13, for example. The desired or designated format can be set by a user, by the device 18, by the VMS 24, by the designated recipient, or by any other authorized party. In one embodiment, the VMS 24 sets the default message conversion format. In another embodiment, the user designates the message conversion format and stores the choice in the preferences. In another embodiment, the user can set the conversion format each time a message is forwarded, as illustrated above in FIG. 13. In another embodiment, the VMS 24 identifies the conversion format by retrieving information relating to the recipient device, for example, the recipient telephone number, the recipient device IMEI, the recipient's network, the recipient's IP address, the recipient's location, and the like. As such, it should be appreciated that a determination step can be included in the illustrated method 800 in which the user, the VMS 24, or another element, designates or determines the conversion format for the message, or portion thereof. Alternatively, as explained above, the message, or a portion thereof, can be forwarded without being converted into an alternative file format.

At block 814, the VMS 24 or the device 18 can forward the message, a portion thereof, or instructions for retrieving the message, to a recipient. As briefly described above, the message recipient can be designated by the user, by the VMS 24, selected by the user, and the like. The illustrated method 800 can include verification steps to ensure that the message is received by the recipient device, connection and communication steps between the VMS 24, the device 18, and the recipient device, depending upon the selected forwarding method and/or format. The method 800 can end.

While the preceding description has described voicemail messages primarily in the context of audio and text messages, it should be appreciated that the VMS 24 can also process, store, archive, convert, and/or forward (handle) video messages, if desired. In the event that the VMS 24 is configured to handle video messages, many of the same processes described above with respect to video and text messages can be used to handle the messages. For example, a video file can include a video component and an audio component. As such, the VMS 24 can archive, convert, and/or forward the audio file, the video file, or both. The conversion can include a speech to text converter, CODECs, and the like, as explained above. As such, a user can archive, convert, store, forward, receive, and retrieve messages as video, audio, text, combinations thereof, and the like.

It must be understood that the illustrated GUIs are exemplary only and other contemplated user interfaces, screen layouts, selection methods, and the like are contemplated, including an embodiment of the VMS 24 that does not provide a GUI at the user's device, the calling party's device, or either device. Furthermore, a selection can be made using various embodiments of softkeys and/or key selections on a mobile or stationary telephone keypad, for example, and is not limited to the illustrated GUI. Additional and/or alternative selector switches and joysticks can be used to select a desired option or icon corresponding to a desired option. Input methods can also include touch screens or voice commands. Any desired screen layout or format can be used, including plain text and icons, for example.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A system comprising: a processor; and
a memory, in communication with the processor, storing instructions which, when executed by the processor, cause the processor to perform operations comprising:
receiving a message directed to a device of a user,
receiving a first command to archive the message,
in response to receiving the command, moving a copy of the message to an archived portion of the memory to store the copy of the message, wherein the copy of the message moved to the archived portion of the memory is an archived copy of the message,
initiating a timer for the archived copy of the message indicating an amount of time the archived copy of the message will be stored,
after initiating the timer for the archived copy of the message, receiving a save message command from the device of the user, and
in response to receiving the save message from the device of the user, reinitiating the timer for the archived copy of the message to restart the amount of time the archived copy of the message will be stored.

2. The system of claim 1, storing further instructions which, when executed by the processor, cause the processor to perform operations comprising receiving a second command to forward the archived copy of the message to a further device of a recipient other than the user.

3. The system of claim 2, storing further instructions which, when executed by the processor, cause the processor to perform operations comprising:
retrieving information related to the further device of the recipient;
determining a conversion format for the archived copy of the message based on the information related to the further device of the recipient;
converting the archived copy of the message from a format to the conversion format; and
forwarding the archived copy of the message converted to the conversion format to the further device of the recipient.

4. The system of claim 1, storing further instructions which, when executed by the processor, cause the processor to perform operations comprising performing billing functions.

5. The system of claim 2, storing further instructions which, when executed by the processor, cause the processor to perform operations comprising receiving a third command to attach a forwarding message to the archived copy of the message instructed to be forwarded to the further device of the recipient.

6. The system of claim 1, storing further instructions which, when executed by the processor, cause the processor to perform operations comprising:
receiving a second command to delete the archived copy of the message; and
in response to receiving the second command to delete the archived copy of the message and prior to deleting the archived copy of the message, providing a request to the device of the user for additional instructions from the user.

7. A method comprising:
receiving, at a processor, a message directed to a device of a user; receiving, at the processor, a first command to archive the message; in response to receiving the command, moving, by the processor, a copy of the message to an archived portion of the memory to store the copy of the message, wherein the copy of the message moved to the archived portion of a memory is an archived copy of the message;
initiating, by the processor, a timer for the archived copy of the message indicating an amount of time the archived copy of the message will be stored;
after initiating the timer for the archived copy of the message, receiving, by the processor, a save message command from the device of the user; and
in response to receiving the save message from the device of the user, reinitiating, by the processor, the timer for the archived copy of the message to restart the amount of time the archived copy of the message will be stored.

8. The method of claim 7, further comprising receiving a second command to forward the archived copy of the message to a further device of a recipient other than the user.

9. The method of claim 8, further comprising- retrieving information related to the further device of the recipient;
determining a conversion format for the archived copy of the message based on the information related to the further device of the recipient;
converting the archived copy of the message from a format to the conversion format; and
forwarding the archived copy of the message converted to the conversion format to the further device of the recipient.

10. The method of claim 8, further comprising receiving a third command to attach a forwarding message to the archived copy of the message instructed to be forwarded to the further device of the recipient.

11. The method of claim 7, further comprising:
receiving a second command to delete the archived copy of the message; and
in response to receiving the second command to delete the archived copy of the message and prior to deleting the archived copy of the message, providing a request to the device of the user for additional instructions from the user.

12. A non-transitory computer-readable storage medium storing instructions that, when executed by a processor, cause the processor to perform operations comprising:
- receiving a message directed to a device of a user; receiving a first command to archive the message;
- in response to receiving the command, moving a copy of the message to an archived portion of a memory to store the copy of the message, wherein the copy of the message moved to the archived portion of the memory is an archived copy of the message;
- initiating a timer for the archived copy of the message indicating an amount of time the archived copy of the message will be stored;
- after initiating the timer for the archived copy of the message, receiving a save message command from the device of the user; and
- in response to receiving the save message from the device of the user, reinitiating the timer for the archived copy of the message to restart the amount of time the archived copy of the message will be stored.

13. The non-transitory computer-readable storage medium of claim 12, storing further instructions that, when executed by the processor, cause the processor to perform operations comprising receiving a second command to forward the archived copy of the message to a further device of a recipient other than the user.

14. The non-transitory computer-readable storage medium of claim 13, storing further instructions that, when executed by the processor, cause the processor to perform operations comprising:
- retrieving information related to the further device of the recipient;
- determining a conversion format for the archived copy of the message based on the information related to the further device of the recipient;
- converting the archived copy of the message from a format to the conversion format; and
- forwarding the archived copy of the message converted to the conversion format to the further device of the recipient.

15. The non-transitory computer-readable storage medium of claim 13, storing further instructions that, when executed by the processor, cause the processor to perform operations comprising receiving a third command to attach a forwarding message to the archived copy of the message instructed to be forwarded to the further device of the recipient.

16. The non-transitory computer-readable storage medium of claim 12, storing further instructions that, when executed by the processor, cause the processor to perform operations comprising:
- receiving a second command to delete the archived copy of the message; and in response to receiving the second command to delete the archived copy of the message and prior to deleting the archived copy of the message, providing a request to the device of the user for additional instructions from the user.

* * * * *